United States Patent
Roy et al.

(10) Patent No.: US 11,444,687 B2
(45) Date of Patent: Sep. 13, 2022

(54) DYNAMIC SWITCHING OF SATELLITE INROUTE DATA PATH BETWEEN A TIME-DIVISION MULTIPLE ACCESS METHOD AND A TIME DIVISION MULTIPLEX METHOD

(71) Applicant: HUGHES NETWORK SYSTEMS, LLC, Germantown, MD (US)

(72) Inventors: Satyajit Roy, Gaithersburg, MD (US); Ramanathan Thirunallaih, Frederick, MD (US); Akshaya Hosalli Mukund, Gaithersburg, MD (US); Archana Gharpuray, Gaithersburg, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 128 days.

(21) Appl. No.: 17/084,422

(22) Filed: Oct. 29, 2020

(65) Prior Publication Data
US 2022/0140891 A1    May 5, 2022

(51) Int. Cl.
*H04B 7/185* (2006.01)
*H04W 76/30* (2018.01)
*H04W 76/25* (2018.01)
*H04B 7/26* (2006.01)

(52) U.S. Cl.
CPC ....... *H04B 7/18532* (2013.01); *H04B 7/2659* (2013.01); *H04W 76/25* (2018.02); *H04W 76/30* (2018.02)

(58) Field of Classification Search
CPC .. H04B 7/18532; H04B 7/2659; H04B 7/185; H04W 76/25; H04W 76/30; H04W 76/20
See application file for complete search history.

(56) References Cited

U.S. PATENT DOCUMENTS

| | | | |
|---|---|---|---|
| 11,159,263 B2* | 10/2021 | Ricker | H04B 7/18513 |
| 2015/0312838 A1 | 10/2015 | Torres et al. | |
| 2018/0241460 A1 | 8/2018 | Hong et al. | |
| 2020/0245192 A1* | 7/2020 | Roy | H04W 28/24 |
| 2021/0194614 A1* | 6/2021 | Ricker | H04B 7/18528 |
| 2022/0108262 A1* | 4/2022 | Cella | G05B 19/41885 |

OTHER PUBLICATIONS

International Search Report and Written Opinion dated Feb. 11, 2022 for International Application No. PCT/US2021/056788.
(Continued)

*Primary Examiner* — Afshawn M Towfighi
(74) *Attorney, Agent, or Firm* — Sheppard, Mullin, Richter & Hampton LLP

(57) ABSTRACT

Some implementations of the disclosure relate to dynamic switching of a satellite inroute data path between a Time Division Multiple Access (TDMA) method and a Time Division Multiplexing (TDM) method. In one implementation, a method comprises: communicating, using a satellite terminal, over an inroute TDMA channel; determining, at the satellite terminal, based at least on an aggregate ingress traffic rate to the satellite terminal, to switch communications from the inroute TDMA channel to an inroute TDM channel; and after determining to switch communications, sending, from the satellite terminal to a Gateway Earth Station, a request to be allocated an inroute TDM channel.

20 Claims, 13 Drawing Sheets

(56) References Cited

OTHER PUBLICATIONS

Shin et al., "On the Mixed Support of TDMA and SCPC for Satellite Disaster Communications Network,", 2017 International Conference on Information and Communication technology Convergence (ICTC), IEEE, Oct. 18, 2017, pp. 1213-1215.

Tropea et al., "Novem MF-TDMA/SCPC Switching Algorithm for DVB-RCS/RCS2 Return Link in Railway Scenario," IEEE Transactions on Aerospace and Electronic Systems, IEEE Service Center, Piscataway, NJ, US, vol. 52, No. 1, Feb. 1, 2016, pp. 275-287.

* cited by examiner

DYNAMIC SWITCHING OF SATELLITE INROUTE DATA PATH BETWEEN A TIME-DIVISION MULTIPLE ACCESS METHOD AND A TIME DIVISION MULTIPLEX METHOD

BACKGROUND

Multi-frequency Time Division Multiple Access (MF-TDMA) is a time and frequency domains sharing scheme, allowing bandwidth resource sharing that offers service providers distinct operating expense advantages in certain cases. Very small aperture terminals (VSATs) or remote satellite terminals using just a time division multiple access (TDMA) channel possess a limitation along a satellite inroute with respect to high speed uploads/inroute bandwidth.

Inroute Time Division Multiplexing (TDM), like Single Channel Per Carrier (SCPC) uses the concept of a dedicated carrier. SCPC however, unlike TDM, does not use DVB-S2 standards and thus does not have the benefits of Adaptive Coding and Modulation (ACM). Further, SCPC uses non-standard coding techniques since the technology was never standardized.

SUMMARY

Implementations of the disclosure are directed to dynamic switching of a satellite inroute data path between a Time Division Multiple Access (TDMA) method and a Time Division Multiplexing (TDM) method.

In one embodiment, a method comprises: communicating, using a satellite terminal, over an inroute TDMA channel; determining, at the satellite terminal, based at least on an aggregate ingress traffic rate to the satellite terminal, to switch communications from the inroute TDMA channel to an inroute TDM channel; and after determining to switch communications, sending, from the satellite terminal to a Gateway Earth Station (GW), a request to be allocated an inroute TDM channel.

In some implementations, the aggregate ingress traffic rate is an aggregate ingress traffic rate of one or more traffic flows received by the satellite terminal on a local area network (LAN) of the satellite terminal.

In some implementations, determining to switch communications, comprises: determining that the aggregate ingress traffic rate exceeds or equals a threshold for a time period.

In some implementations, determining to switch communications, comprises: determining that at least one of the traffic flows matches a TDMA to TDM switching rule; and determining that the aggregate ingress traffic rate exceeds or equals a threshold. In some implementations, the aggregate ingress traffic rate is determined at the satellite terminal in response to determining that that at least one of the traffic flows matches a TDMA to TDM switching rule. In some implementations, determining that at least one of the traffic flows matches the TDMA to TDM switching rule, comprises: classifying each of the one or more traffic flows; and determining, based on a classification table, that one of the classified traffic flows matches the TDMA to TDM switching rule.

In some implementations, the method further comprises; after sending the request: receiving, at the satellite terminal from the GW, a response message indicating that an inroute TDM channel was successfully allocated, the response message including information identifying the allocated inroute TDM channel; and after receiving the response message, switching at the satellite terminal from communicating over the inroute TDMA channel to communicating over the allocated inroute TDM channel. In some implementations, sending the request, comprises: sending the request to the GW over the inroute TDMA channel, wherein the response message is received by the satellite terminal over the inroute TDMA channel. In some implementations, the request comprises an identification of a TDM inroute group managed at the GW, wherein the TDM inroute group comprises a plurality TDM channels, and wherein the allocated inroute TDM channel is one of the plurality of TDM channels.

In some implementations, the method further comprises: after switching at the satellite terminal from communicating over the inroute TDMA channel to communicating over the allocated inroute TDM channel: transmitting, from the satellite terminal to the GW, a periodic keep alive message to remain on the allocated inroute TDM channel.

In some implementations, the method further comprises: after switching at the satellite terminal from communicating over the inroute TDMA channel to communicating over the allocated inroute TDM channel: determining, at the satellite terminal, to switch back to communicating over an inroute TDMA channel; and after determining to switch back, sending, from the satellite terminal to the GW, a channel release request to release the allocated inroute TDM channel. In some implementations, determining, at the satellite terminal, to switch back to communicating over an inroute TDMA channel, comprises: determining at least one of the following conditions: the aggregate ingress traffic rate to the satellite terminal dropped to below a threshold or equal to the threshold for a period of time; and determining that no traffic flow received at the satellite terminal matches a TDMA to TDM switching rule.

In some implementations, the method further comprises: after sending the request: receiving, at the satellite terminal from the GW, a response message indicating a failure to allocate an inroute TDM channel; and after receiving the response message: resending, after a predetermined time period, the request to be allocated an inroute TDM channel.

In one embodiment, a satellite terminal, comprises: one or more processors; and one or more non-transitory computer-readable storage medium storing instructions that, when executed by the one or more processors, cause the satellite terminal to perform a method, comprising: communicating, using a satellite terminal, over a TDMA channel; determining, at the satellite terminal, based at least on an aggregate ingress traffic rate to the satellite terminal, to switch communications from the inroute TDMA channel to an inroute TDM channel; and after determining to switch communications, sending, from the satellite terminal to a GW, a request to be allocated an inroute TDM channel.

In one embodiment, a method comprises: receiving, at a GW, a request from a satellite terminal to be allocated a TDM channel for inroute communications; in response to receiving the request, determining at the GW, that the satellite terminal is eligible to be assigned an inroute TDM channel from a TDM inroute group; assigning the inroute TDM channel to the satellite terminal; and transmitting a message to the terminal identifying the assigned inroute TDM channel. In some implementations, the request comprises an identifier of the TDM inroute group, wherein determining that the satellite terminal is eligible to be assigned the inroute TDM channel from the TDM inroute group, comprises: identifying, using the identifier in the request, the TDM inroute group; and determining that the inroute TDM channel is available for assignment from the TDM inroute group.

In some implementations, determining that the inroute TDM channel is available for assignment from the TDM inroute group, comprises: determining the inroute TDM channel is not currently assigned to another satellite terminal.

In some implementations the satellite terminal is a first satellite terminal, and determining that the inroute TDM channel is available for assignment from the TDM inroute group, comprises: determining that a priority of the first satellite terminal is higher than a priority of a second satellite terminal currently assigned the inroute TDM channel; and assigning the inroute TDM channel, comprises: reassigning the inroute TDM channel from the second satellite terminal to the first satellite terminal.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As used herein, the term "inroute channel" and variants thereof refers to a channel used by a terminal to transmit an inroute signal to a Gateway Earth Station (GW). A channel may be characterized by a carrier frequency and a symbol rate. An inroute TDMA channel may refer to an inroute channel where multiple terminals can share the same channel (i.e., same frequency) by using a time division multiplexing access channel access method with different time slots. Each terminal may use a different/corresponding time slot allocated by a GW when sharing an inroute channel with other terminals. An inroute TDM channel may refer to an inroute channel that is dedicated to one terminal at a given time, i.e., one terminal may transmit at the channel's frequency at a time. The GW may allocate the TDM channel to the terminal.

Implementations of the disclosure relate to dynamic switching of a satellite inroute data path between a TDMA method and a TDM method. In accordance with implementations of the disclosure, a satellite communication system may be implemented as a hybrid system based on TDM/TDMA and TDM/TDM schemes. In this case, the X/Y representation uses X as the forward or outroute channel scheme and Y as the return or inroute channel scheme. The satellite communication systems described herein may leverage the advantages of both the TDM/TDMA and TDM/TDM schemes, allow terminals to switch between the two types of inroutes (TDM and TDMA) to mitigate the disadvantages or obtain the advantages each inroute scheme may possess. As such, by virtue of providing dynamic switching support between TDMA and TDM inroutes to a satellite terminal, the satellite terminal may take advantage of either communication scheme depending on traffic characteristic or classification rules.

Figure 1:
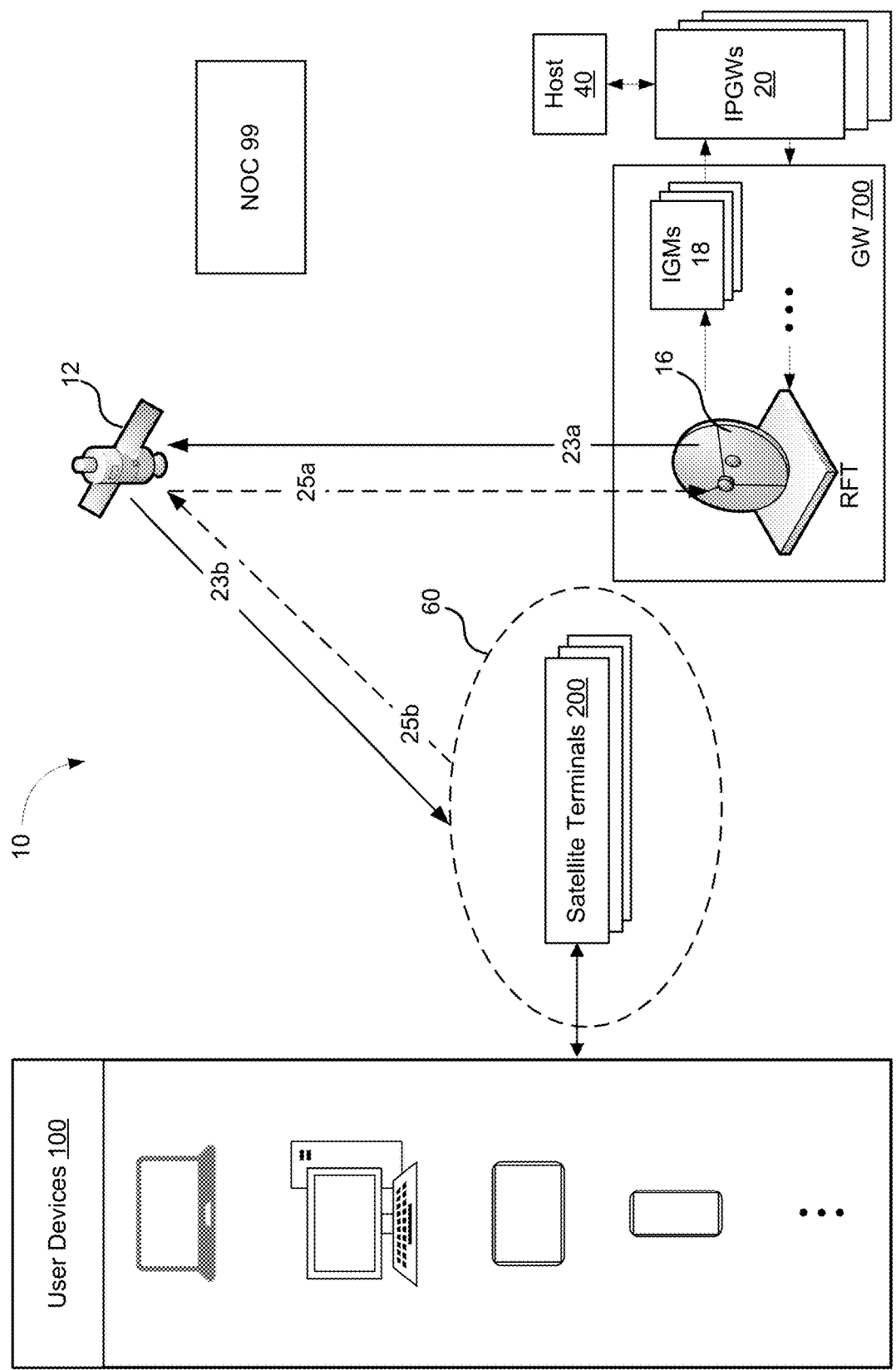
FIG. 1 illustrates an example satellite network including a satellite terminal with which the TDM/TDMA switching techniques described herein may be implemented.

FIG. 1 illustrates an example satellite network 10 including a satellite terminal 200 with which the TDM/TDMA switching techniques described herein may be implemented. Satellite network 10 in this example includes a satellite 12, satellite terminals 200, GW 700, and one or more IP gateways (IPGWs) 20. GW 700 may be configured as a high capacity earth station with connectivity to ground telecommunications infrastructure. A network operations center (NOC) 99 may be communicatively coupled to GW 700 over a network and direct its operation. NOC 99 may be located remotely from GW 700 or co-located with GW 700. NOC 99 may manage satellite network and subscriber services. GW 700 includes one or more radio frequency terminals (RFT) 16 that includes the physical equipment responsible for sending and receiving signals to and from satellite 12, and may provide an interface for GW 700. GW 700 also includes one or more inroute group managers (IGMs) 18, further described below.

Although a single satellite 12 is shown in this example, it should be appreciated that satellite network 10 may be a multi-satellite network where a particular satellite services a satellite terminal 200 depending on the present location of the satellite terminal 200 and present location of the spot-beam of the satellite. Additionally, although a single GW 700 is shown in this example, it should be appreciated that satellite network 10 may comprise multiple GWs 700.

Feeder links may carry data between RFT 16 and satellite 12, and may include: forward uplink 23a for transmitting data from RFT 16 to satellite 12; and return downlink 25a for transmitting data from satellite 12 to RFT 16. User links may carry data between satellite 12 and satellite terminals 200, and may include: return uplink 25b for transmitting data from satellite terminals 200 to satellite 12; and forward downlinks 23b for transmitting data from satellite 12 to terminals 200. Forward uplink 23a and forward downlink 23b may form an outroute, and return uplink 25b and return downlink 25a may form a set of inroutes. Satellite 12 may transmit satellite signals corresponding to user spot beam 60 having a coverage area that may be in the geographic region in which terminals 200 are located and are able to connect to satellite 12.

Satellite 12 may be any suitable communication satellite. For example, satellite 12 may be a bent-pipe design geostationary satellite, which can accommodate innovations and variations in transmission parameters, operating in the Ka-band, Ku-band or C-band. Satellite 12 may use one or more spot beams as well as frequency and polarization reuse to maximize the total capacity of satellite network 10. Signals passing through satellite 12 in the forward direction may be based on the DVB-S2 standard (ETSI EN 302 307) or DVB-S2X standard using signal constellations up to and including at least 256-APSK. The signals intended to pass through satellite in the return direction from satellite terminals 200 may be based on the Internet Protocol over Satellite (IPoS) standard (ETSI TS 102 354). Other suitable signal types may also be used in either direction, including, for example higher data rate variations of DVB-S2.

IPGWs 20 may include the set of layer 2 and layer 3 packet processing equipment between GW 700 and the Internet. In some implementations, IPGW may be collocated with GW 700. In other implementations, IPGWs 20 may be provisioned at another location. In some implementations, multiple IPGWs may be connected to GW 700. IPGWs 20 may be an ingress portion of a local network. IP traffic, including TCP traffic originating from a host 40 from the internet, may enter GW 700 through IPGWs 20. The bandwidth of RFT 16 may be shared amongst IPGWs 20.

IGMs 18 may be bandwidth controllers running bandwidth allocation algorithms. The IGMs may manage bandwidth of satellite terminal 200 and other terminals in the form of inroute groups (IGs), based in part on bandwidth demand requests from the remote terminals. In implementations, IGMS 18 include a TDM Inroute Bandwidth Manager further discussed below.

Data from an internet intended for a satellite terminal 200 may be in the form of IP packets, including TCP packets and UDP packets, or any other suitable IP packets, and may enter GW 700 at any one of IPGWs 20. The IP packets may be processed and multiplexed by GW 700 along with IP packets from other IPGWs, where the IPGWs may or may not have the same service capabilities and relative priorities. The IP packets may be transmitted to satellite 12 on forward uplink 23a using the air interface provided by RFT 16. Satellite 12 may them transmit the IP packet to the satellite terminal 200 using forward downlink 23b. Similarly, IP packets may enter the network via satellite terminal 200, be processed by a satellite terminal 200, and transmitted to satellite 12 on return uplink 25b. Satellite 12 may then send these inroute IP packets to GW 700 using return downlink 25a.

A satellite terminal 200 may connect to the Internet or other network through satellite 12 and IPGWs 20/GW 700 and provide access to the Internet or other network to one or more user devices 100 that connect to satellite terminal 200. In particular, satellite terminal 200 may include an internet modem via which network packets flow. For example, satellite terminal 200 may provide IP address and other assignments via the dynamic host configuration protocol (DHCP), and respond to requests for renewal and updates; respond to Address Resolution Protocol (ARP) requests for any IP address on the local subnet in instances where terminal 200 serves as the gateway to the internet; carry unicast IP (TCP and UDP) packets to the space link; carry multicast UDP/IP packets to the space link if enabled; accept IP packets directed to its local IP address (e.g., for WebUI); and perform other functions.

A satellite terminal 200 may be configured as a VSAT. In some implementations, the satellite terminal 200 may be a satellite terminal of a customer's premise, including a modem. In other implementations, the satellite terminal 200 may be implemented as a modem with integrated transmit/receive circuitry mounted on a mobile platform. In some implementations, the satellite terminal 200 may be implemented as a community WiFi terminal that includes a modem and a WiFi router. The community WiFi terminal may provide service to multiple households or to users visiting a community access site (e.g., a coffee shop).

In some implementations, satellite terminal 200 may include a satellite indoor unit (IDU) communicatively coupled to a satellite outdoor unit (ODU). The satellite IDU may include a modem, and the satellite ODU may include a radio frequency unit (RFU) and antenna. The RFU may include an upconverter for upconverting signals received from the satellite IDU. For example, the upconverter may be used in the transmission of satellite inroute signals via the antenna by frequency upconverting an IF signal received by the RFU from the modem. The upconverter may amplify the signal. The frequency upconverted (and amplified) signal may be sent to the antenna, which may focus the signal into a narrow beam for transmission to a satellite. In some implementations, the upconverter may be mounted on the antenna. For example, the upconverter may be a block upconverter (BUC) mounted on a dish. The antenna may be any suitable antenna design (e.g., small aperture parabolic antenna design) configured to transmit and receive electromagnetic signals to and from one or more satellites.

The one or more user devices 100 may include any user device that is provided access to the Internet or other network by a satellite modem of satellite terminal 200. For example, the one or more user devices 100 may be a laptop, a desktop computer, a router, a tablet, a smartphone, a smart television, a smart home device, etc. A user device 100 may transmit packets to or receive packets from a modem of satellite terminal 200. The user device 100 may wirelessly couple to the modem (e.g., over WiFi) or communicatively couple to the modem of the satellite terminal 200 over an ethernet cable. In some implementations, the satellite modem may comprise an integrated router. In other implementations, the satellite modem may communicatively couple to a router that receives packets from the user devices 100.

In various implementations, satellite network 10 is configured to implement a hybrid TDM/TDMA and TDM/TDM communication scheme whereby each satellite terminal 200 may dynamically switch between communications over a TDMA inroute and communications over a TDM inroute. In both the TDM/TDM and TDM/TDMA communication schemes, the satellite communication network 10 may use a single high-speed TDM carrier transmitted from GW 700 from which many satellite terminals 200 may receive information. For the TDM outroute link, a standard such as the DVB-S2X standard may be used to provide flexibility for multiplexing many concurrent streams of traffic to different sites, and provide efficient support of ACM. ACM may be used to dynamically adjusts the modulation and coding on the "virtual link" to each satellite terminal 200 individually, as local conditions (e.g., weather, interference) at the satellite terminal change.

The TDM/TDMA scheme, which uses TDMA along the return link (or inroute), may allow satellite terminals 200 to dynamically share multiple TDMA carriers, as if they were a single large pool of bandwidth. Each TDMA carrier group may contain dozens of carriers. The satellite terminals 200 in the TDM/TDMA network may be synchronized, and transmit information in burst mode within a series of short, scheduled timeslots. Timeslots may be assigned to each satellite terminal 200 exclusively in stream mode based on the current need. This may be referred to as Dynamic TDMA. TDMA carriers may have the following key attributes: A TDMA inroute group may contain multiple individual TDMA inroute carriers with the constraints that all carriers must be of same symbol rate; adaptive coding and modulation (ACM) may be supported on a single inroute or carrier; and Adaptive Inroute Selection (AIS) by terminals may supported.

Use of TDMA instead of TDM along the inroute may confer the following advantages. Interactive IP data traffic (e.g. web browsing, email download) is notoriously bursty in the return channel. This results in huge statistical multiplexing gains from using bandwidth-on-demand feature of TDMA technology. These efficient gains can reduce aggregate bandwidth needs depending on two key traffic pattern attributes: i) the peak-to-average load ratios for traffic at each site during the peak hour; and ii) the variability in the timing of the peak hour, across the various sites. In general, the TDMA scheme may be efficient for burst-like traffic, for example, Internet browsing, SCADA, Banking Machines, and ATM transactions. In both the TDM/TDM and TDM/TDMA schemes, the satellite communication system may use a single high-speed TDM carrier transmitted from GW 700 from which many satellite terminals 200 may receive information.

By contrast, the TDM/TDM configuration, which uses TDM along the inroute, may use TDM carriers for individual satellite terminals 100 that transmits in continuous mode. One TDM carrier may be used by one satellite terminal 200 at a given time. TDM return channels may have the following key attributes: they may follow the DVB-S2X standard; and they may support ACM. The TDM/TDM scheme, may confer the following advantages in the satellite network 100. TDM continuous return channels may be useful where fast access to large amounts of capacity for the return link traffic must be guaranteed. It may provide better modem efficiency (in bits/Hz) than TDMA burst mode. MF-TDMA may require a serious overhead (around 20%) because of guard times between bursts in addition to an overhead of encapsulation. The TDM continuous transmission link may also provide lower latency and jitter. These links may be operated at a higher speed than TDMA links. The use of bi-directional ACM (in a TDM/TDM link) may result in reliable service, withstanding signal fade caused by bad weather. Additionally, the TDM return channel may be very "cost effective" in networks with nearly constant levels of traffic in the peak hour at each site, a consistent peak hour time each day. In general, the TDM scheme may be efficient for continuous streaming traffic such as, for example, video, trunking data, and content distribution.

Figure 8:
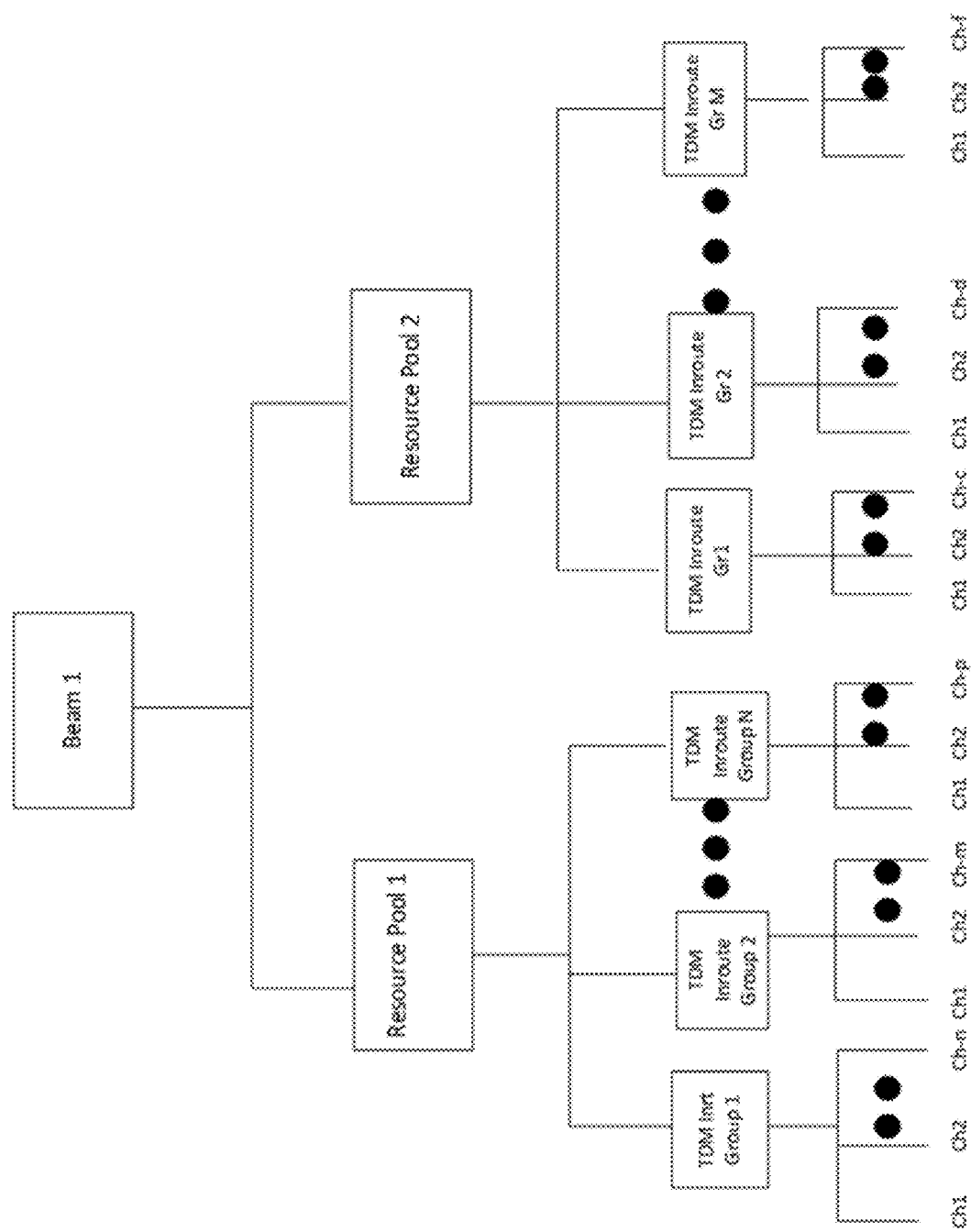
FIG. 8 depicts an example hierarchy of an inroute TDM channel allocation for a spot beam, in accordance with implementations of the disclosure.

To support dynamic allocation of TDM channels to TDM capable satellite terminals 200, the satellite communication system may configure (e.g., via a NOC 99) one or multiple TDM pools and one or multiple TDM inroute groups per satellite beam 60. ATDM pool or inroute group may be configured with one or multiple TDM channels. A TDM channel may be characterized by its symbol rate and its center frequency. One pool or TDM inroute group may have dissimilar symbol rates TDM channels. FIG. 8 depicts an example hierarchy of an inroute TDM channel allocation for a spot beam. In this example, the beam is divided into two TDM resource pools. Each TDM resource pool is further divided into multiple TDM inroute groups, which each TDM inroute group including multiple TDM channels.

Along with dynamic TDM channel support, the satellite communication system may also support dedicated channel and hybrid TDM channel assignment. These channels may be assigned to terminals in a dedicated fashion. In some implementations, the system may also support dynamically changing TDM inroute size to keep a terminal on a TDM inroute based on its ingress rate.

In some implementations, a virtual network operator (VNO) may be assigned with one or multiple TDM inroute groups from each beam/resource pool as necessary. In some implementations, a TDM inroute group may be shared by multiple VNOs. This may be referred to as a VNO's subscription of TDM inroute groups or pools. In some implementations, a TDM inroute group may be dedicated to a VNO. In some implementations, dedicated TDM channels that are not part of any TDM inroute group may be configured. These dedicated channels may be assigned to a VNO to provide service.

Figure 2:
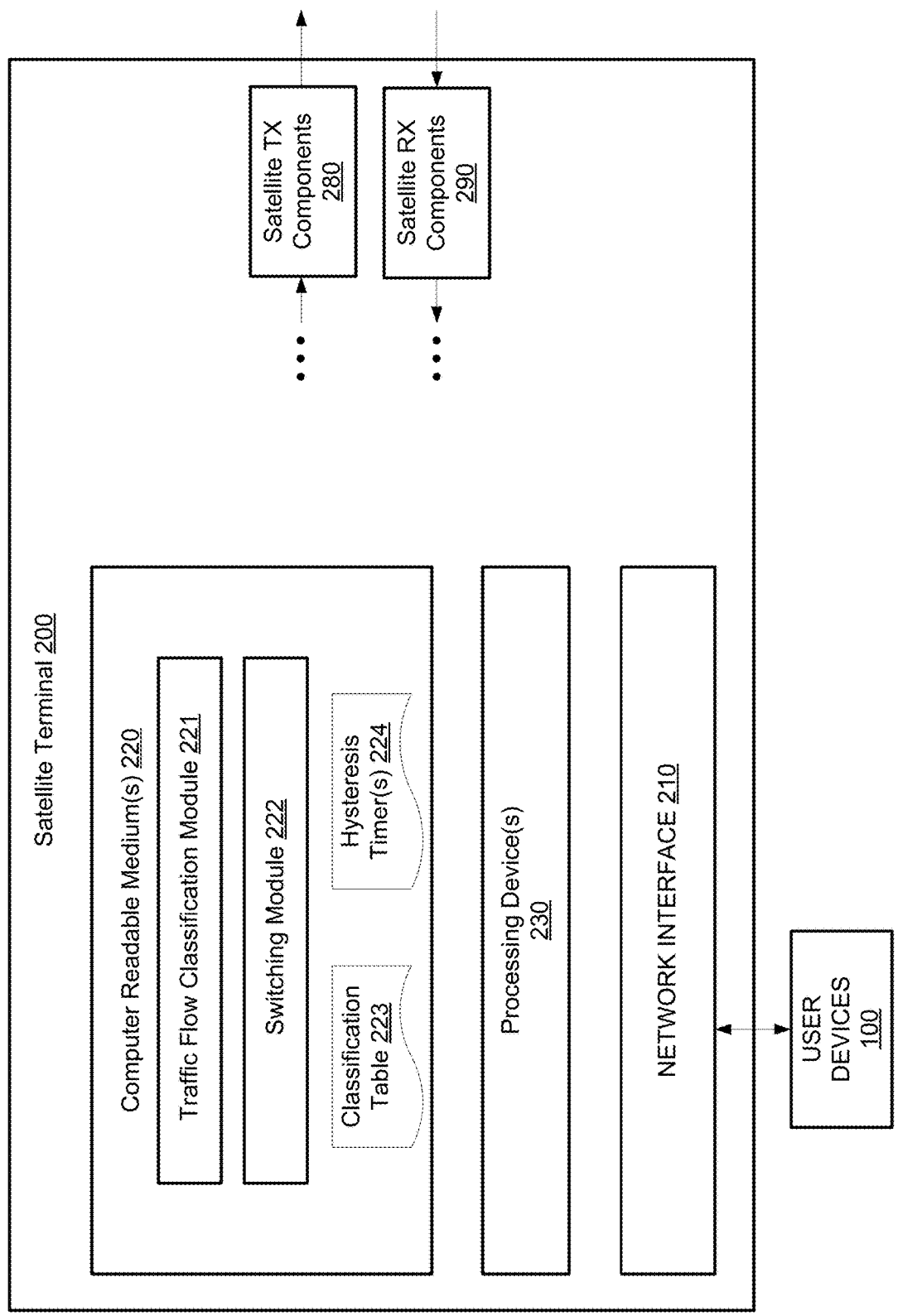
FIG. 2 is a block diagram illustrating some components of a satellite terminal, in accordance with implementations of the disclosure.

FIG. 2 is a block diagram illustrating some components of a satellite terminal 200, in accordance with implementations of the disclosure. As depicted, satellite terminal 200 includes a network interface 210 (e.g., WiFi and/or Ethernet) for communicatively coupling to user devices 100 (e.g., via a modem of satellite terminal 200), one or more computer readable mediums 220, one or more processing devices 230, satellite transmit (TX) components 280, and satellite receive (RX) components 290. For simplicity of discussion, other components of satellite terminal 200 are excluded from FIG. 2. Satellite TX components 280 and satellite RX components 290 may communicatively couple satellite terminal 200 to a satellite communication network (e.g., as part of an IDU/ODU configuration). Satellite TX components 280 may apply functions for transmitting data (e.g., user data appearing at the local Ethernet connection destined to the satellite link) such as forward error correction (FEC) encoding, bit-to-symbol modulation, transmit pulse-shaping, carrier signal modulation, and other satellite transmission functions. Satellite RX components 290 may provide functions to a satellite receive signal such as carrier down conversion, receive pulse-shaping, symbol-to-bit decoding, and other satellite receiver functions.

The computer readable medium(s) 220 may include a traffic flow classification module 221, a switching module 222, a classification table 223, and one or more hysteresis timers 224. The switching module 222 includes instructions that are executable by a processing device 230 to determine when terminal 200 switches between TDMA and TDM inroutes. To this end, terminal 200 may also utilize a traffic flow classification module 221 that classifies incoming traffic flows from user devices 100 to determine what flows should be transmitted over a TDMA inroute versus a TDM inroute.

In this example, satellite terminal 200 comprises an integrated router. As such, satellite terminal 200 is directly communicatively coupled to user devices 100 via network interface 210. For example, a modem of satellite terminal 200 may form a home local area network (LAN) with user devices 100. By virtue of having an integrated router, the modem may uniquely identify user devices 100 and their associated traffic flows by accessing a NAT table (not shown) and ARP table (not shown) stored in a computer readable medium 220. User devices 100 may be uniquely identified by their MAC address for both NAT-ed IPv4 traffic and IPv6 traffic. For example, the ARP table may store a mapping between the IP addresses and MAC addresses of user devices 100. For each connection or traffic flow associated with a given user device 100, the NAT table may maintain a pairing of the user device's private IP address with destination IP address and port. This pairing may be referred to as a connection. Each user device 100 may have multiple active connections. As such, using entries of the NAT table, data packets may be pushed to the public network (e.g., Internet), to its intended host destination IP address.

In alternative implementations, user devices 100 may directly communicatively couple to a separate router device that connects to satellite terminal 200 via network interface 210. In such implementations, although user devices 100 may not be identified using their unique MAC addresses for IPv4 traffic, a user device 100 may be identified via a predominant service it is used for. For example, the device may be identified via the characteristics of the traffic flows it sends or receive, or the destination address of its traffic flows.

Traffic flow classification module 221 may utilize one or more techniques to classify incoming traffic flows from user devices 100. In some implementations, each traffic flow is classified based on the four tuple: source IP address, source port, destination IP address, destination port.

In some implementations, traffic flows may be classified by statistically profiling them based on their use of bandwidth over time. This profiling technique may consider, for example, the frequency and size of traffic bursts, where traffic bursts refer to group of data packets with small inter-arrival gaps as compared to burst inter-arrival time. For instance, consider a user that sends a webpage request (e.g., using HTTP or HTTPs protocol) to a server that responds with a group of packets. On receiving a response, the user may send another request to continue the interaction. In this scenario, the burst inter arrival time, which is based on user interaction, is random. As such, with statistical classification, the profile of a traffic session may be captured to determine what traffic class the traffic session belongs to.

In some implementations, traffic flow classification module 221 may classify traffic flows by analyzing traffic flows for local hosts associated with user devices 100 and remote hosts (e.g., host 40) communicating with user devices 100. Each time a new TCP connection application type is detected for a host, a counter associated with the application type may be incremented. These statistics may be stored in a number of data structures, that cumulatively represent a configurable tracking time window (e.g., seconds, minutes, hours, or days) for the host. These data structures may be of configurable size (e.g., in seconds). In such implementations, the traffic flow classification module 221 may classify TCP connections as belonging to one of five application types or categories: transactional; interactive; streaming; bulk; or default. A transactional application type may correspond to TCP connection having a short connection time (e.g., a few bytes of data such as instant messages). An interactive application type may correspond to a TCP connection such as web browsing. A streaming application type may correspond to a TCP connection that carries streaming video or audio data. A bulk application type may correspond to a TCP connection that carries a large amount of data (e.g., file transfer of a movie, video game, or other large file). A default application type may correspond to a TCP connection that cannot be identified as having a particular classification. It should be noted that these TCP application types are exemplary and other categorizations may be used. For example, the grouping or number of application types may vary. Particular methods of classifying TCP connections are further described in U.S. patent application Ser. Nos. 15/344,684 and 15/348,837, which are incorporated herein by reference.

In some instances, a combination of the aforementioned techniques may be used to classify the traffic flows. For example, if the four tuple is insufficient to classify the traffic flow, statistical profiling may be implemented using module 221 to classify the flow.

In some implementations, current network conditions may also be considered for classifying each traffic flow. In such implementations, the boundary of the class of service used for classification purposes may depend on current network conditions. For example, in the case of a satellite backhaul network the available bandwidth may be lower due to rain fade condition, and in this case the boundary for each service class may shrink, downgrading an otherwise interactive class flow to a streaming class flow.

In some implementations a two-pass approach may be utilized for flow classification. In the first pass, a flow may be classified solely based on its profile, traffic flow behavior and/or traffic flow host based history. In the second pass, the boundary of the service class may be determined based on the network condition and the actual current traffic volume and the configured bandwidth for the service class.

Figure 3:
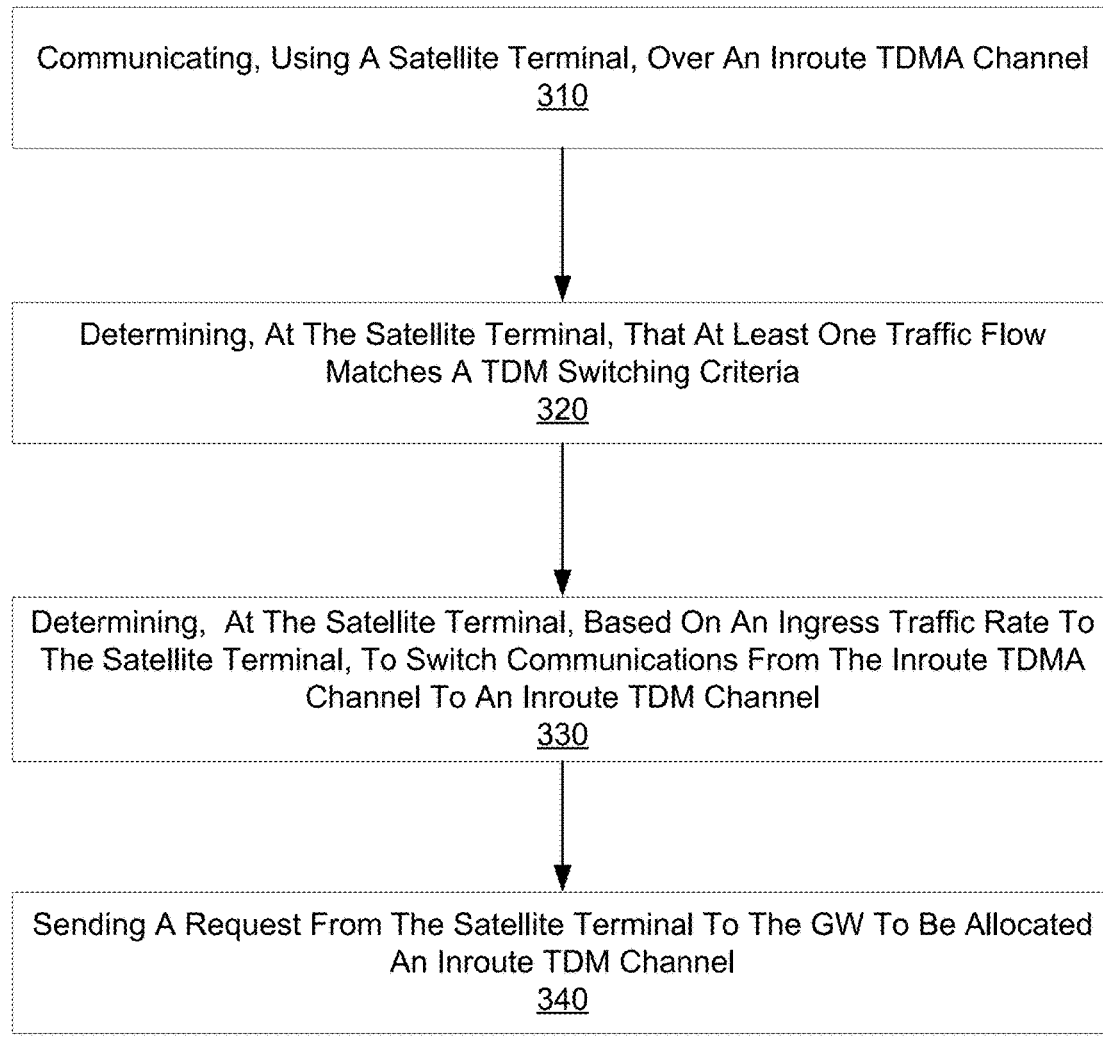
FIG. 3 is an operational flow diagram illustrating an example method that may be implemented by a satellite terminal to switch from communicating data over an inroute TDMA channel to communicating data over an inroute TDM channel, in accordance with implementations of the disclosure.

FIG. 3 is an operational flow diagram illustrating an example method 300 that may be implemented by a satellite terminal 200 to switch from communicating data over an inroute TDMA channel to communicating data over an inroute TDM channel, in accordance with implementations of the disclosure. In implementations, method 300 may be implemented by executing instructions stored in a computer readable medium 220 (e.g., using traffic flow classification module 221 and/or switching module 222).

At operation 310, the satellite terminal 200 communicates over an inroute TDMA channel. Data may be transmitted over a TDMA inroute of a satellite network to a GW 700 (e.g., for transmission to a remote host on the Internet). At startup, a satellite terminal 200 may camp on a TDMA channel (e.g., Aloha followed by TDMA stream channel) to send internal control and management packets. There may not be any user flows initially. The satellite terminal 200 may remain on the TDMA channel to send internal messages or other data (e.g., user flows) until triggers for switching to a TDM channel, are satisfied. In particular implementations, further described below, a two-level trigger mechanism is utilized to move the inroute traffic of terminal 200 from TDMA access scheme to a TDM access scheme. At the first level, TDM eligibility may be governed by one or more classification rules. At the second level, TDM eligibility may be governed by a traffic ingress rate at the terminal 200.

At operation 320, the satellite terminal 200 determines that at least one traffic flow received at the satellite terminal 200 matches a TDMA to TDM switching criteria or rule. One or more classification rules may be used to determine that a traffic flow matches the TDMA to TDM switching criteria. For example, as discussed above, a TDM return/inroute channel may offer superior link quality (e.g., low latency, low jitter, a higher speed and better response to signal fade) for particular types of traffic, including streaming traffic. As such, one classification rule may specify that a traffic flow classified as "streaming" traffic matches the switching criteria.

As new ingress traffic flows from user devices 100 are received, terminal 200 may classify each of them, e.g., using one or more of the classification techniques of traffic classification module 221 discussed above. The traffic flows may be connections classified according to layer 2 or layer 3 parameters such as IP, MAC, VLAN, DSCP, etc. In some implementations, in order to determine that least one active traffic flows matches a TDMA to TDM switching criteria, a classification table 223 may be maintained that comprises a current classification of each traffic flow and at least one output parameter indicating whether or not the satellite terminal 200 is eligible to switch to a TDM inroute from a TDMA inroute. One or multiple classification rows may be configured in classification table 223 for TDM switching eligibility. For example, if a first flow matches a "switch to TDM" channel rule, then the terminal will determine that it is eligible to switch from a TDMA to TDM channel; otherwise, the terminal may remain on the TDMA channel.

At operation 330, the satellite terminal 200 determines based on an ingress traffic rate to the satellite terminal 200, to switch communications from the inroute TDMA channel to an inroute TDM channel. Once the satellite terminal 200 reaches the eligibility of switching to a TDM inroute (e.g., a flow is classified for switching to TDM at operation 320), satellite terminal 200 may evaluate the aggregate ingress rate of incoming traffic flows (e.g., from user devices 100) to terminal 200 on the local area network (LAN) of satellite terminal 200. If the aggregate ingress rate exceeds or is equal to a threshold for switching from TDMA to TDM, the satellite terminal 200 may determine to switch from the inroute TDMA channel to an inroute TDM channel. The threshold for switching from TDMA to TDM may be a user-configurable value.

Figure 4:
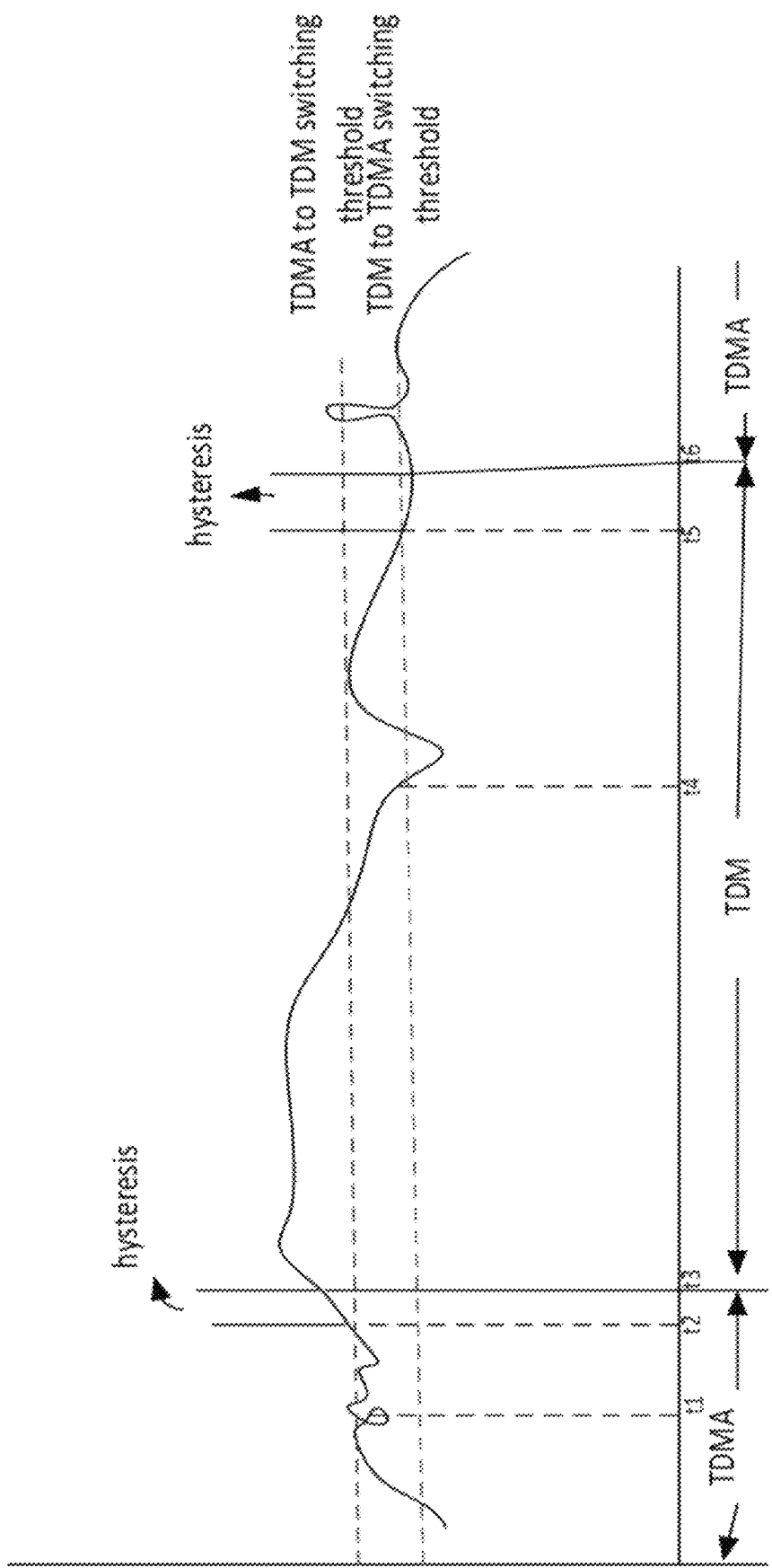
FIG. 4 is a plot showing an inroute transmission channel used by a satellite terminal over time, in accordance with implementation of the disclosure.

In implementations, the satellite terminal may determine to switch from the inroute TDMA channel to an inroute TDM channel if the aggregate ingress rate exceeds or equals the threshold for a period of time. To this end, a hysteresis timer 224 may be used to monitor whether the period of time exceeds or equals a threshold time period. This time period may be user configurable. To illustrate, FIG. 4 is a plot showing an inroute transmission channel used by a satellite terminal over time, in accordance with implementation of the disclosure. In this example, the terminal starts on the inroute TDMA channel and is monitoring the incoming traffic rate (e.g., LAN's ingress rate). At time t1, the rate exceeds the TDMA to TDM switching threshold; however, the terminal does not switch to the inroute TDM channel because after a short while (which is less than a hysteresis timer) the rate drops. At time t2, the rate again exceeds the TDMA to TDM switching threshold rate. This time, the rate remains above the threshold for a duration that is more than the hysteresis time and so the terminal switches to the inroute TDM channel at time t3.

By virtue of switching based on an ingress rate to the satellite terminal, the following advantages may be realized. In a system where the number of TDM channels is less than the number of terminals needing TDM channels at the same time (i.e., over subscription), a TDM channel may be allocated only when a terminal needs it. If the rate falls below the configured rate, the TDM channel may be deallocated and given to the free pool for other terminals to use. This terminal may then be assigned with a TDMA channel.

After startup, the rate of user flows to terminal 100 may begin at a smaller rate and then increases. Accordingly, the terminal may typically start on a TDMA channel to carry the user traffic and then switch to the TDM channel as the rate increases.

At operation 340, after determining to switch to a TDM channel, the satellite terminal 200 sends a request to a GW 700 to be allocated an inroute TDM channel. In implementations, the request may be transmitted over the inroute TDMA channel. In implementations, the request message may comprise one or more of the following parameters: TDM Inroute Group ID of a TDM Inroute Group that the terminal belongs to, an estimated symbol rate, a raw traffic rate, power headroom, a channel identifier, and a terminal identifier.

In implementations, where a TDM channel is available for allocation, the terminal may receive a response message from GW 700 indicating a successful allocation of a TDM channel, including information identifying the TDM channel that the terminal may switch to, e.g., the channel's symbol rate and frequency. The terminal may then switch to communicating over the allocated TDM channel.

In implementations where a TDM channel is not available for allocation to the terminal, the terminal may receive a response message from GW 700 indicating a failure for its dynamic TDM channel request, and the terminal may remain on the TDMA channel. In such implementations, after a timeout period (e.g., a "TDM assignment failure timeout"), the terminal 200 may resend the request to be allocated an inroute TDM channel if the TDMA to TDM switching criteria are still met. This process may iterate.

After the terminal switches to communicating over the TDM channel, it may be configured to transmit a periodic keep alive message to the GW 700. This may be advantageous in satellite networks where the TDM channel assignment process is dynamic. The periodicity of the keep alive message may be configurable.

In implementations where satellite terminal 200 is a mobile terminal (e.g., terminal of aircraft, ship, or terrestrial vehicle), it may be configured to release a current TDM channel assignment (e.g., by transmitting a channel release message to the GW 700) as it moves to a new spot beam or satellite. It may then start service on TDMA in the new beam or satellite by making a switch from TDM to TDMA. Afterwards, the mobile terminal may request a TDM channel if the switching conditions are met.

Figure 5:
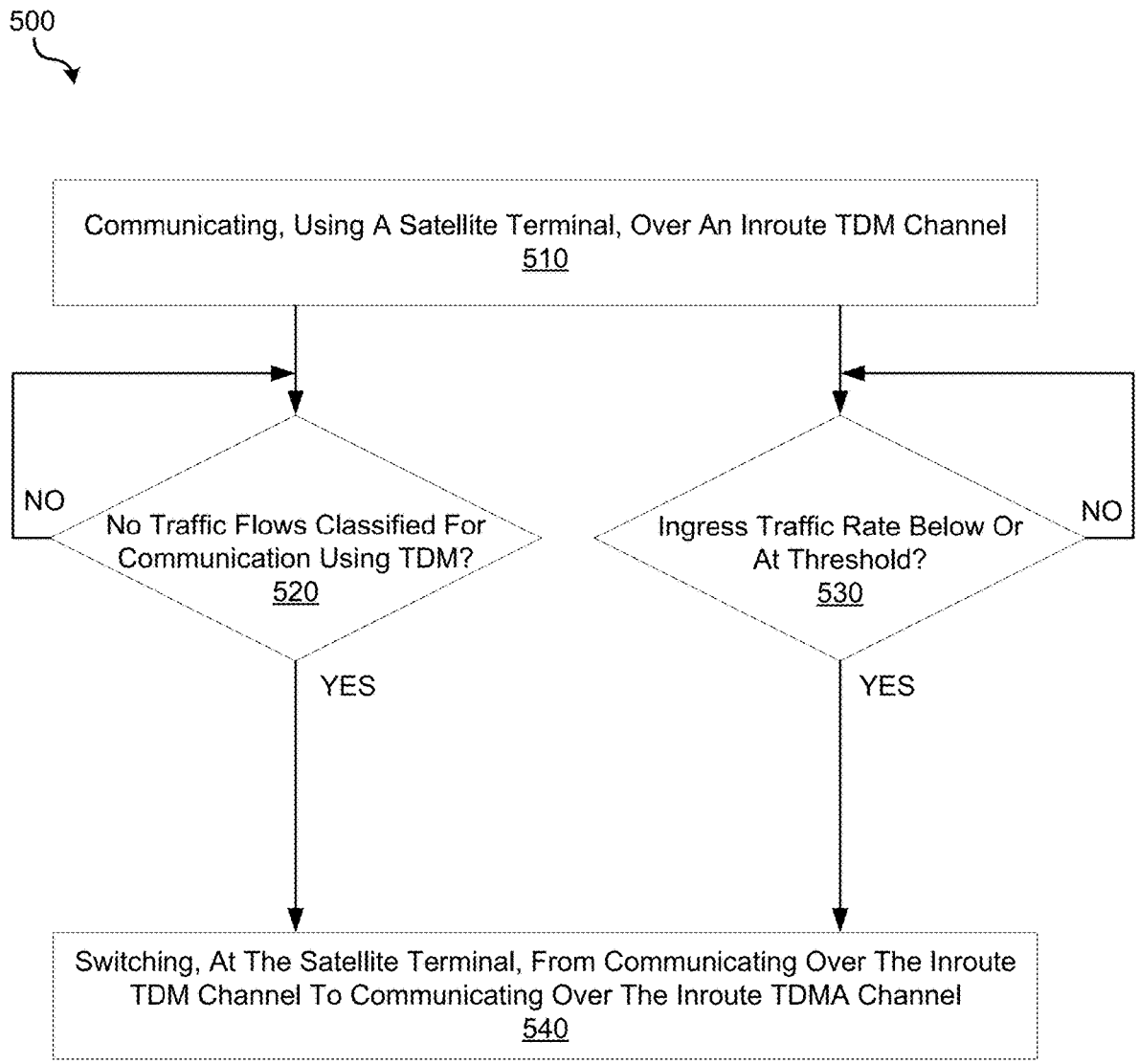
FIG. 5 is an operational flow diagram illustrating an example method that may be implemented by a satellite terminal to switch from communicating data over an inroute TDM channel to communicating data over an inroute TDMA channel, in accordance with implementations of the disclosure.

FIG. 5 is an operational flow diagram illustrating an example method 500 that may be implemented by a satellite terminal 500 to switch from communicating data over an inroute TDM channel to communicating data over an inroute TDMA channel, in accordance with implementations of the disclosure. For example, method 500 may be implemented after method 300 for initiating communications over the TDM channel. In implementations, method 50 may be implemented by executing instructions stored in a computer readable medium 220 (e.g., using traffic flow classification module 221 and/or switching module 222).

At operation 510, the satellite terminal 200 communicates over an inroute TDM channel. Data may be transmitted over a TDM inroute of a satellite network to a GW 700 (e.g., for transmission to a remote host on the Internet). Afterward, the satellite terminal 200 may switch from communicating over the inroute TDM channel to communicating over an inroute TDMA channel (operation 540) if either decision 520 or decision 530 is true.

At operation decision 520, the satellite terminal 200 determines, whether or not no traffic flows classified for communication using TDM are at the terminal. Decision 520 may be implemented in a manner similar to that discussed above with respect to operation 320. One or more classification rules may be used to determine whether or not a traffic flow matches a TDMA to TDM switching criteria (e.g., based on classification table 223). For example, if all traffic switches back to being bursty (e.g., web browsing), the TDMA return link may be once again utilized and TDM bandwidth returned to a "pool". In some implementations, to prevent constant switching, the terminal may make the decision to switch if no traffic flows meet a TDM criteria for a predetermined period of time.

At decision 530, the satellite terminal 200 determines whether its ingress traffic rate to the satellite terminal 200 falls below or meets a threshold. Satellite terminal 200 may evaluate the aggregate ingress rate of incoming traffic flows to terminal 200 on the local area network (LAN) of satellite terminal 200, and if the aggregate ingress rate falls below or is equal to a threshold for switching from TDM to TDMA, the satellite terminal 200 may determine to switch from the inroute TDM channel to an inroute TDMA channel. The threshold for switching from TDM to TDMA may be a user-configurable value. The threshold may be the same as or less than the threshold for switching from TDMA to TDM.

In implementations, the satellite terminal may determine to switch from the inroute TDM channel to an inroute TDMA channel if the aggregate ingress rate falls below or equals the threshold for a period of time. To this end, a hysteresis timer 224 may be used to monitor whether the period of time exceeds or equals a threshold time period. This time period may be user configurable.

Referring again to the example plot of FIG. 4, which shows an inroute transmission channel used by a satellite terminal over time, at time t4, the traffic rate falls below the TDM to TDMA switching threshold but switching does not occur as after a short while before the hysteresis timer expires, the rate moves above the threshold. At t5, the rate again falls and this time at t6 the terminal switches to TDMA channel after the expiry of the hysteresis timer. At time t7, there is a big spike in the rate, however, the terminal does not switch to TDM channel as the duration of the spike is small enough compared to the hysteresis timer.

At operation 540, the satellite terminal 100 switches from communicating over the inroute TDM channel to communicating over an inroute TDMA channel. In implementations, this operation may include the satellite terminal 100 sending a channel release request to the GW 700 to release the channel from the terminal. The release request may be sent over the inroute TDM channel. The channel release request may comprise information identifying the terminal. The terminal 100 may then receive an acknowledgement message from the GW 700 acknowledging that the inroute TDM channel was released. There is a possibility that the release channel request from the terminal or the acknowledgement message from the GW is lost. As such, in some implementations, the terminal does not wait for the acknowledgement message before moving to TDMA after releasing its TDM channel. The terminal may receive the acknowledgement (if not lost) and log the acknowledgement, but the terminal may be configured such that it does not wait for acknowledgement to make the decision to switch to TDMA. As such, after sending the release request message, the terminal may forget the TDM channel and use TDMA afterwards to send any packet on the inroute until the rate-based/classification-based rules trigger the terminal to move back to a TDM channel.

There is a possibility that after moving back to the TDMA channel from TDM, that the terminal may observe issues on the inroute channel(s), such as high error rate, traffic is not going through, etc. If such a case arises, the terminal may remain on the TDMA channel until the switching criteria moves it back to a TDM channel and during this period inroute traffic may not go through (PEP backbones and/or association may go down).

Figure 6:
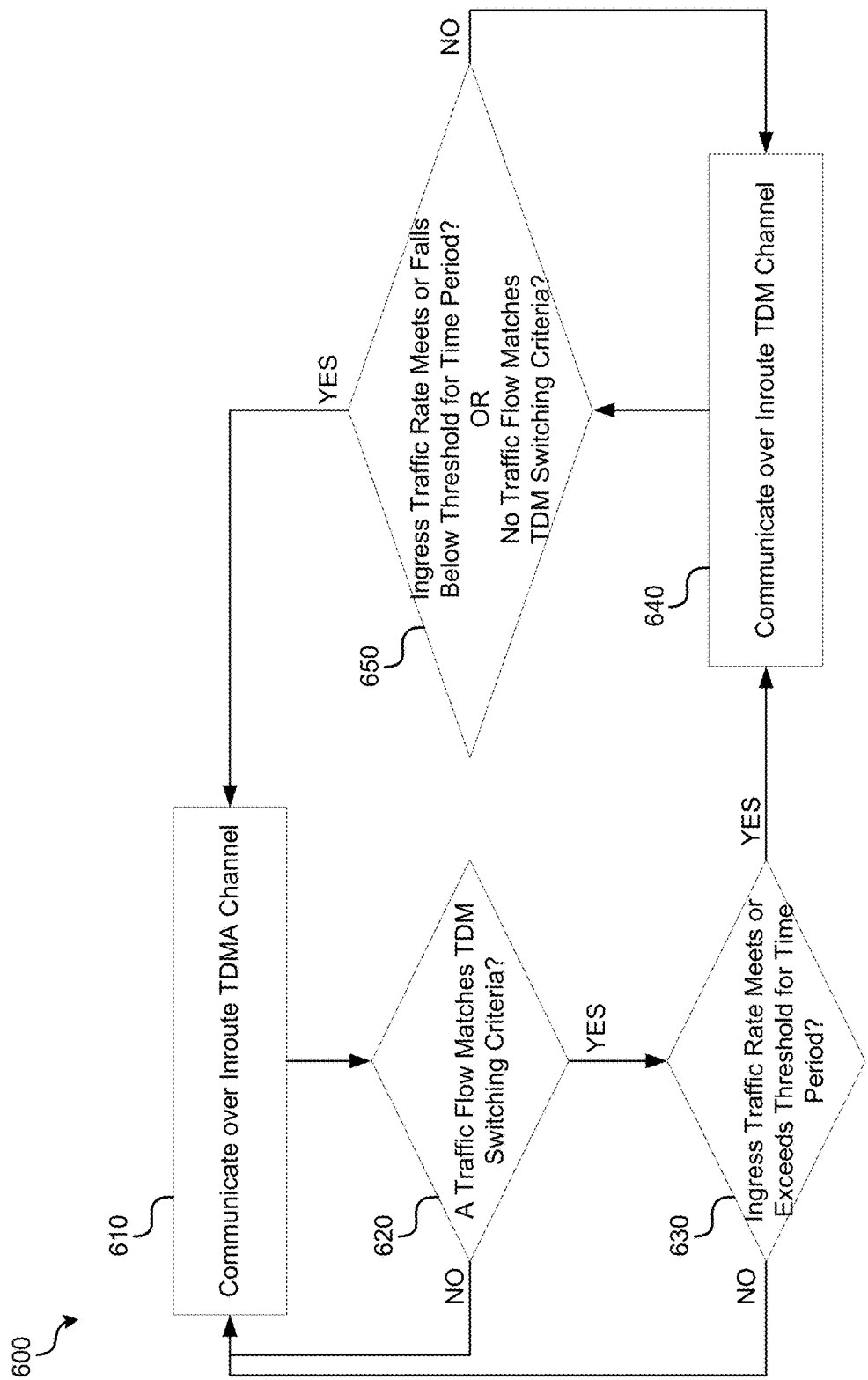
FIG. 6 is an operational flow diagram illustrating an example method that a satellite terminal may implement to dynamically switch between an inroute TDMA channel and an inroute TDM channel, in accordance with implementations of the disclosure.

FIG. 6 is an operational flow diagram illustrating an example method 600 that a satellite terminal 200 may implement to dynamically switch between an inroute TDMA channel and an inroute TDM channel. For simplicity of illustration, in this example it is assumed that a TDM channel is available for assignment to the terminal.

At operation 610, the terminal communicates over an inroute TDMA channel. At decision 620, the terminal determines if a traffic flow matches a TDM switching criteria. If no, it continues communicating over the inroute TDMA channel. If yes, at decision 630 the terminal determines if the ingress traffic rate meets or exceeds a threshold TDMA-to-TDM switching rate for a period of time. If no, the terminal continues communicating over the inroute TDMA channel. If yes, the terminal switches to communicating over an inroute TDM channel (operation 640). At decision 650, it is determined whether one of the following conditions is satisfied: i) the ingress traffic rate meets or falls below a threshold TDM-to-TDMA switching rate for a time period; or no traffic flows match a TDM switching criteria. If neither condition is satisfied, the terminal may continue communicating over the inroute TDM channel. On the other hand, if at least one of these conditions is satisfied, the terminal may switch to communicating over an inroute TDMA channel.

Figure 7:
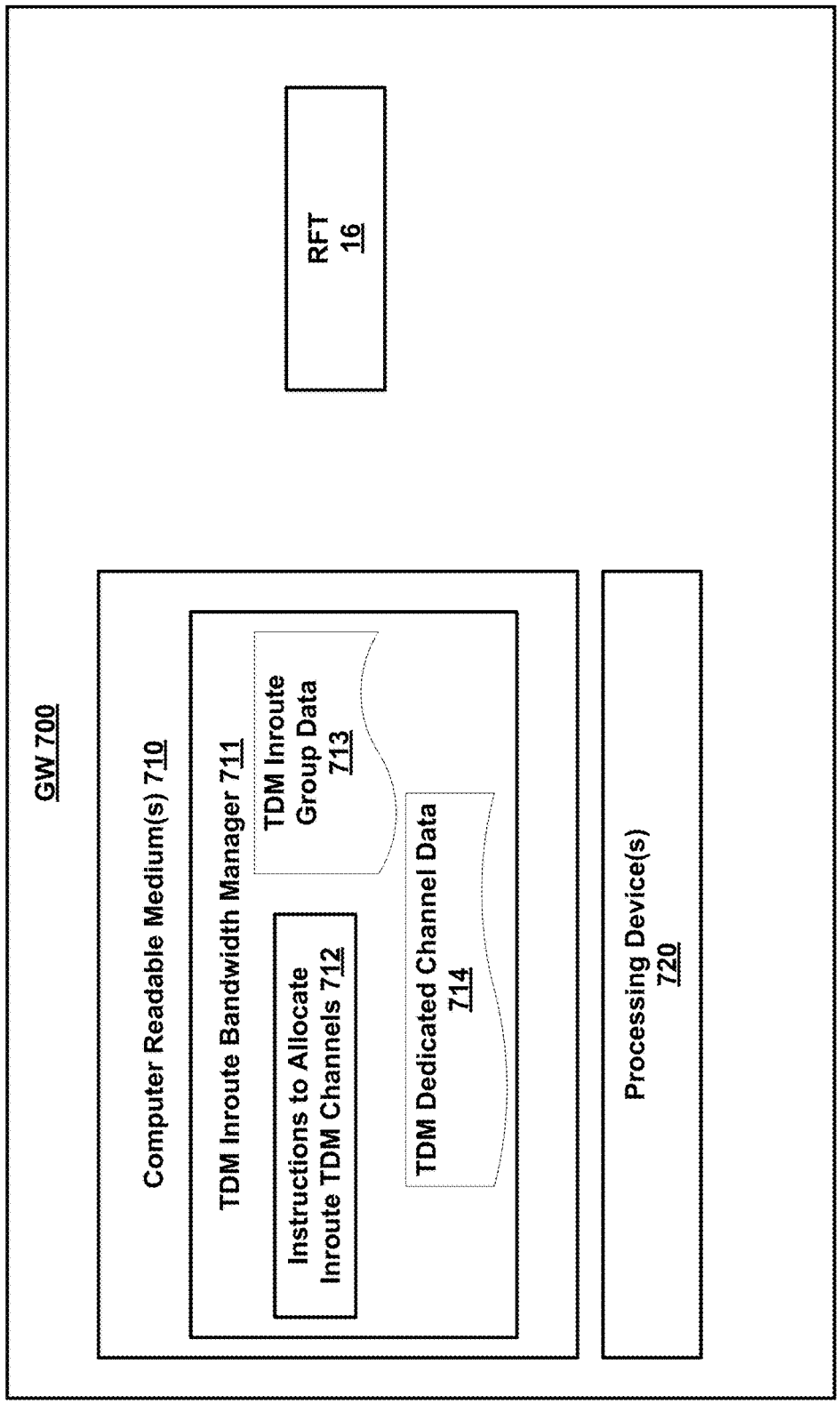
FIG. 7 is a block diagram illustrating some components of a GW, in accordance with implementations of the disclosure.

FIG. 7 is a block diagram illustrating some components of a GW 700, in accordance with implementations of the disclosure. As depicted, GW 700 includes one or more computer readable mediums 710, one or more processing devices 720, and RFT 16. For simplicity of discussion, other components of GW 700 are excluded from FIG. 7. The computer readable medium(s) 710 may include a TDM inroute bandwidth manager (TBM) 711 that store instructions 712 that may be executed by a processing device 720 to allocate inroute TDM channels. The computer readable medium(s) 710 may also store TDM inroute group data 713 and TDM dedicated channel data 714.

TBM 711 is configured to manage assignment of TDM channels to satellite terminals 200. It may assign both dynamic and static (dedicated) channels. Each TDM channel may be assigned a corresponding receiver at the GW 700 to receive an inroute TDM signal on the TDM channel. TDM inroute group data 713 maintained at TBM 711 may be used to maintain a mapping between TDM inroute group channels and satellite terminals. In particular implementations, TDM inroute group data 713 may include one or more of the following: TDM Inroute Group ID (one or multiple); for each TDM Inroute Group: assigned VNOs (one or multiple), number of TDM channels, and information about each TDM channel in the group (e.g., assigned receiver, beam ID, beam name, channel identifier, center frequency, symbol rate, low-density parity-check (LDPC) decode mode (standard belief or layered belief), etc.). In accordance with implementations of the disclosure, dynamic TDM/TDMA inroute switching may be made possible at the terminals 200 by virtue of configuring one or more TDM inroute groups at SG 700.

In some implementations, TBM 711 may continuously monitor all satellite terminals allocated with TDM channels for their required symbol rates, which may vary over time. The TBM may dynamically manage the channel assignment where it may assign to some of already allocated terminals with smaller symbol rate channels and some of the terminals with higher symbol rate channels compared to their current assignments.

Figure 9:
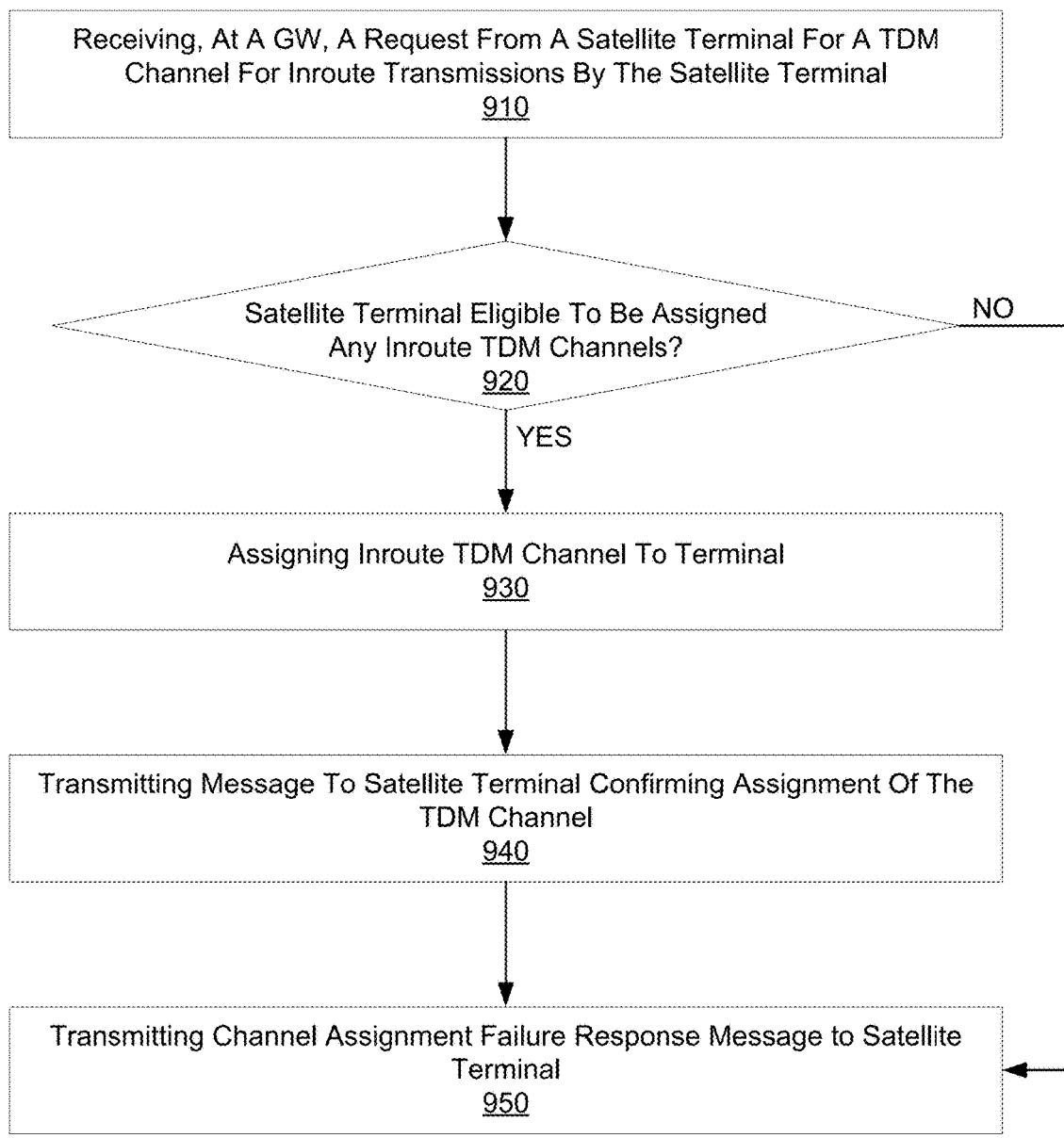
FIG. 9 is an operational flow diagram illustrating an example method that may be implemented by a GW to dynamically allocate an inroute TDM channel to a satellite terminal, in accordance with implementations of the disclosure.

FIG. 9 is an operational flow diagram 900 illustrating an example method 900 that may be implemented by a GW 700 to dynamically allocate an inroute TDM channel to a satellite terminal 200, in accordance with implementations of the disclosure. Method 900 may be implemented using a TBM 711.

At operation 910, the GW 700 receives a request from a satellite terminal 200 for a TDM channel for inroute transmissions by the satellite terminal. The request may be made by the satellite terminal when it needs to move from TDMA to TDM or needs to start on a TDM channel. In implementations, the TDM channel assignment request sent by the terminal may include parameters relating to a TDM channel. For example, the request may specify: an identifier of a TDM inroute group, estimated symbol rate, raw traffic rate, power headroom, a channel identifier, and/or a terminal identifier. When a terminal 200 is moving from a TDMA channel to a TDM channel, it may send the channel assignment request message via the TDMA channel. In some implementations, the GW 700 may determine if the requesting terminal belongs to a TDM Inroute group or a dedicated channel. If the channel request message contains an identifier of a TDM Inroute Group, the GW may infer that the request is for a dynamic TDM channel. If the channel request message does not contain a TDM Inroute Group, the GW may infer that the request is for a dedicated channel.

At decision 920, in response to receiving the request, the GW 700 (e.g., using TBM 711) determines if the satellite terminal is eligible to be assigned any inroute TDM channels. If the channel request message contains an identifier of a TDM inroute group, the GW may determine if the satellite terminal is eligible by checking, based on the identifier, if the inroute group exists. If the inroute group does not exist, the GW may determine that the satellite terminal is not eligible and transmit a channel assignment failure response message to the satellite terminal (operation 950).

If the GW determines that the terminal is associated with a TDM inroute group (e.g., by checking an identifier of the TDM inroute group included in the request), the GW may determine if the satellite terminal is eligible by checking if there are any TDM channels available to assign in the TDM inroute group. If no channels are available (e.g., all are already assigned to other terminal(s)), the GW may determine that the satellite terminal is not eligible and transmit a channel assignment failure response message to the satellite terminal (operation 950). For example, it is possible that a TDM inroute group has been assigned to more terminals than the number of channels included in that group. In alternative implementations, further discussed below, dynamic TDM channel allocation to terminals may still be implemented in such a scenario.

If a TDM channel is available for assignment to the terminal, at operation 930, an inroute TDM channel is assigned to the requesting terminal. In some implementations, the GW may assign to the terminal the next available highest symbol rate channel from the TDM inroute group. For example, this approach may be taken when the terminal request does not specify an estimated symbol rate.

In implementations where the request from the terminal includes an estimated symbol rate, the GW (e.g., using TBM 711) may assign the terminal an inroute TDM channel having the closest available symbol rate to the estimated symbol rate contained in the request. In a particular implementation, the GW may assign the closest available symbol rate in accordance with the following procedure. The TBM 711 may calculate two deltas $-\Delta_{high}$ and $\Delta_{low}$, where $\Delta_{high}$ is delta between the nearest available channel ($Ch_H$) in the terminal's TDM inroute group whose symbol rate is higher than or equal to the estimated rate and the estimated symbol rate, and $\Delta_{low}$ is the delta between the estimated symbol rate and the nearest available channel ($Ch_L$) in the terminal's TDM inroute group whose symbol rate is lower than or equal to the estimated symbol rate. $\Delta_{high}$ may be set to a negative number if there is no available channel of symbol rate greater than or equal to the estimated symbol rate. $\Delta_{low}$, may be set to a negative number if there is no available channel of symbol rate lower than or equal to the estimated symbol rate. In this example, channel allocation may proceed in accordance with one or more of the following set of rules: i) If both $\Delta_{high}$ and $\Delta_{low}$, are negative, no channel assignment and transmit channel assignment failure response message; ii) If both $\Delta_{high}$ and $\Delta_{low}$, are zero, the channel whose symbol rate is equal to the estimated symbol rate is assigned; iii) If $\Delta_{high}$ is negative but $\Delta_{low}$ is not negative, assign $Ch_L$ to the terminal; iv) If $\Delta_{low}$ is negative but $\Delta_{high}$ is not negative, assign $Ch_H$ to the terminal; and v) If both $\Delta_{high}$ and $\Delta_{low}$, are not negative and also both not zero: assign $Ch_H$ if $\Delta_{high} \leq \Delta_{low}$; else Assign $Ch_L$.

In some implementations, rather than the satellite terminal transmitting an estimated symbol rate (e.g., that it calculated) to the GW, the GW may calculate the estimated symbol rate and performed the above-described operations. In such implementations, the satellite terminal's request may include the ingress traffic rate and the power headroom of the terminal, and the GW may calculate a most suitable symbol rate for the terminal based on the ingress traffic rate and power headroom.

In implementations, after an inroute TDM channel is assigned to the requesting terminal, the GW may label the TDM channel being used by the terminal by saving identifying information of the terminal to which the channel is allocated. In such implementations, until the channel is released by the terminal (e.g., by sending a release request including the identifying information of the terminal), the channel may not be assigned to another terminal.

In some implementations, a configured policy for TDM channel assignment may support TDM channel preemption. One such policy may be based on the relative priorities between different satellite terminals, which may be maintained at, for example, TBM 711. In such implementations, decision 920 may include determining the requesting satellite terminal's priority relative to other satellite terminals that have been allocated TDM channels within a TDM inroute group. For example, if all channels within a TDM inroute group are presently allocated to terminals, but the requesting terminal's priority is greater than at least one of the terminals already allocated with a TDM channel, the GW may release the channel assigned to a lower priority terminal (e.g., lowest priority terminal) and assign it to the requesting terminal. It may be possible that the channel size occupied by the lowest priority terminal is small compared to the requirement of the requesting terminal. In such implementations, if supported by the policy, the GW may consider other lower priority terminals (e.g., next lowest priority terminal and so forth) to find a TDM channel that is closest in size to the requesting terminal's communication requirements. If such a channel is not presently available, the GW may transmit a failure response message to the terminal (operation 950).

At operation 940, after an inroute TDM channel is assigned to the terminal, a message is transmitted to the terminal confirming assignment of the inroute TDM channel. The message may include a frequency and symbol rate of the assigned inroute TDM channel.

As noted above, there may be a periodic keep alive message received from the terminal by the GW after the terminal starts using the TDM channel. In such implementations, if the GW does not receive a keep alive message for the assigned dynamic TDM channel from the terminal for one or more consecutive periods (where the number of consecutive periods may be configurable), the GW may take away the TDM channel from the terminal. In implementations where a dedicated (static) TDM channel is configured for a terminal, a periodic keep alive message may not be received and the GW may not take away the channel if the keep alive message is not received.

In some implementations, if a terminal with a dynamic channel assignment moves back quickly from TDMA to TDM (after switching from TDM to TDMA) it may be possible that its previous TDM channel has not yet been revoked and the GW continues to assign the same channel upon receiving the channel request message from the terminal.

Figure 10:
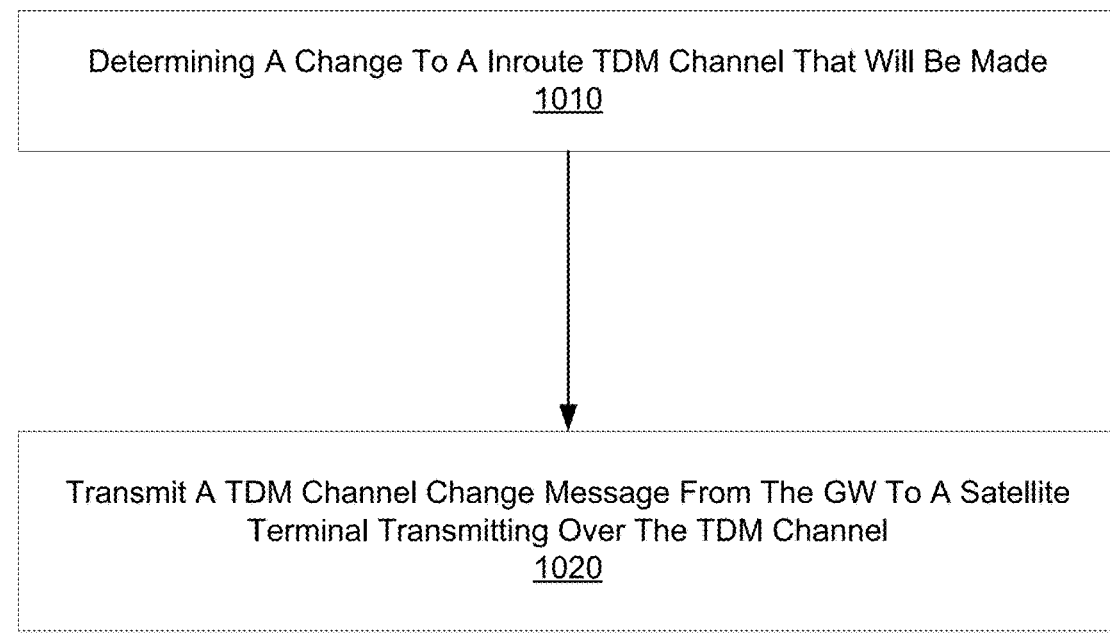
FIG. 10 is an operational flow diagram illustrating an example method that may be implemented by a NMS and/or GW to notify a terminal of an inroute TDM channel change that will affect the terminal, in accordance with implementations of the disclosure.

During operation, TDM inroute groups and associated channel configurations may be changed from a network manage system (NMS) associated with the GW. Some of these changes may not affect already configured terminals. For example, a new TDM inroute group (having a new identifier) and its associated channels may be added. However, other changes may affect already configured terminals, in which case they may need to be notified of the change. To this end, FIG. 10 is an operational flow diagram illustrating an example method 1000 that may be implemented by a NMS and/or GW to notify a terminal of an inroute TDM channel change that will affect the terminal.

At operation 1010, it is determined that a change to an inroute TDM channel will be made. For example, it may be determined that a TDM inroute group and all of its channels will be deleted, or some of a group's channels will be deleted. As another example, it may be determined that a TDM channel will be changed by, for example, changing the symbol rate of the channel and/or the center frequency of the channel.

At operation 1020, a TDM channel change message is transmitted from the GW to a satellite terminal transmitting over the inroute TDM channel. The message may specify the change to the inroute TDM channel and/or a time when the change becomes effective. For example, terminals using the deleted channels may be notified and move to TDMA before the time of the change.

In implementations where the symbol rate and/or center frequency of an existing dynamic channel is changed, the TBM may send an unsolicited TDM channel assignment message to the affected terminal. The format of the message may be similar to the channel assignment response message but additionally specify a future time (e.g., TDMA frame number) when the change will be effective. The terminal receiving the unsolicited TDM channel assignment message may check if it is currently on a TDM channel or on a TDMA channel. The terminal may ignore the message if it is no longer on a TDM channel. This may happen, for example, if the terminal moves to TDMA but TBM is not able to revoke the TDM channel because the release channel request is lost. If the terminal is currently on a TDM channel, it may save the new channel information and the TDMA frame number, and reconfigure the channel (e.g., channel symbol rate and/or frequency) before the occurrence of the TDMA frame number.

It may be possible that a terminal has moved away from TDM to TDMA before the effective TDMA frame number occurs. In such implementations, if a TDM channel definition (e.g., symbol rate and its center frequency) is changed but the application of the new information is pending, the TBM may send both the current channel and the new definition of the channel along with the effective TDMA frame number in a channel assignment response message when the terminal requests assignment of a TDM channel.

Although some embodiments of dynamic channel assignment have thus far been discussed primarily in the context of predefined channels where a GW/TBM distributes channels to multiple terminals without changing channel definitions dynamically, it should be appreciated that the technology described herein may implemented where channel definitions are dynamically changed based on the requirements of the terminals of the satellite network. For example, instead of preempting a channel from a terminal, a TBM may evaluate if by changing the size of some channels a requesting terminal can be assigned a channel without taking away a channel from a lower priority terminal. Additionally, the TBM may proactively evaluate the demand from different terminals and their power head room, accordingly change a channel definition to a new definition that is most suitable at a specific time; and then use unsolicited channel assignment messages to assign new channels to existing terminals.

Figure 11:
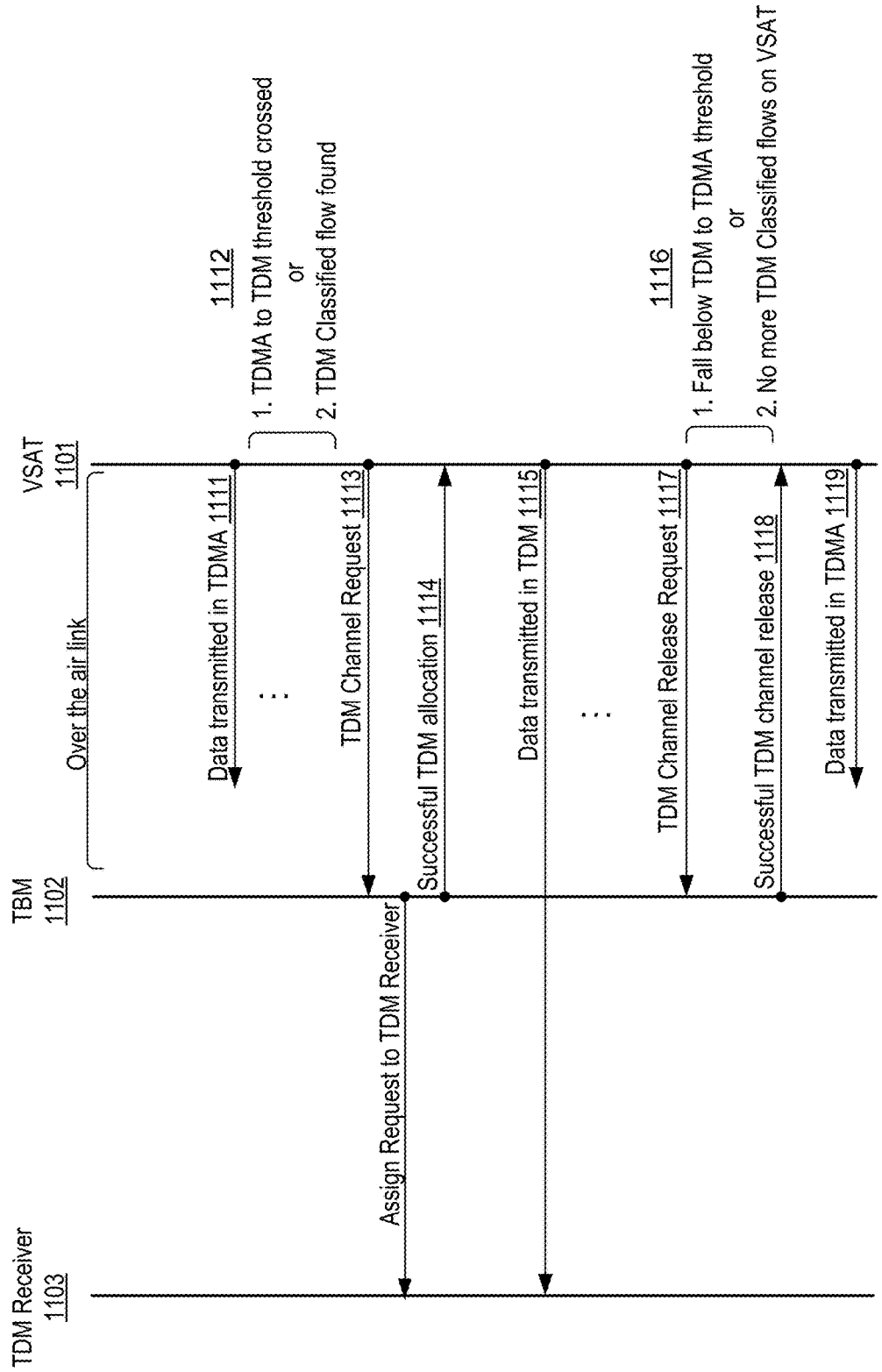
FIG. 11 is a sequence diagram depicting dynamic switching of a VSAT between inroute TDMA and TDM channels, in accordance with implementations of the disclosure.

FIG. 11 is a sequence diagram depicting dynamic switching of a VSAT between inroute TDMA and TDM channels, in accordance with implementations of the disclosure. As depicted, VSAT 1101 communicates with a GW over a satellite network using an over the air link. Communications may be received by a TBM 1102 of a GW. The VSAT 1101 may transmit data in an inroute TDMA channel (step 1111). At some point, based on a trigger 1112 (i.e., TDM classified flow found; and/or VSAT ingress rate exceeds TDMA to TDM threshold), the VSAT 1111 transmits a TDM channel request (step 1113). The TBM 1102 processes the request, including assigning the request to a TDM Receiver 1103 of the GW, to allocate a TDM channel to VSAT 1101, and transmit a successful TDM allocation message to VSAT 1101 (step 1114). The VSAT 1101 then transmits data to TDM receiver 1103 of the GW over the inroute TDM channel (step 1115). At some point, based on a trigger 1116 (VSAT ingress rate falls below TDM to TDMA threshold; or no more TDM classified flows on VSAT), the VSAT 1101 transmits a TDM channel release request (step 1117). The TBM 1102 processes the request to release the TDM channel, and transmits a successful TDM channel release message to VSAT 1101 (step 1118). After the VSAT 1101 transmits the channel release request, it resumes transmitting data in an inroute TDMA channel (step 1119).

Figure 12:
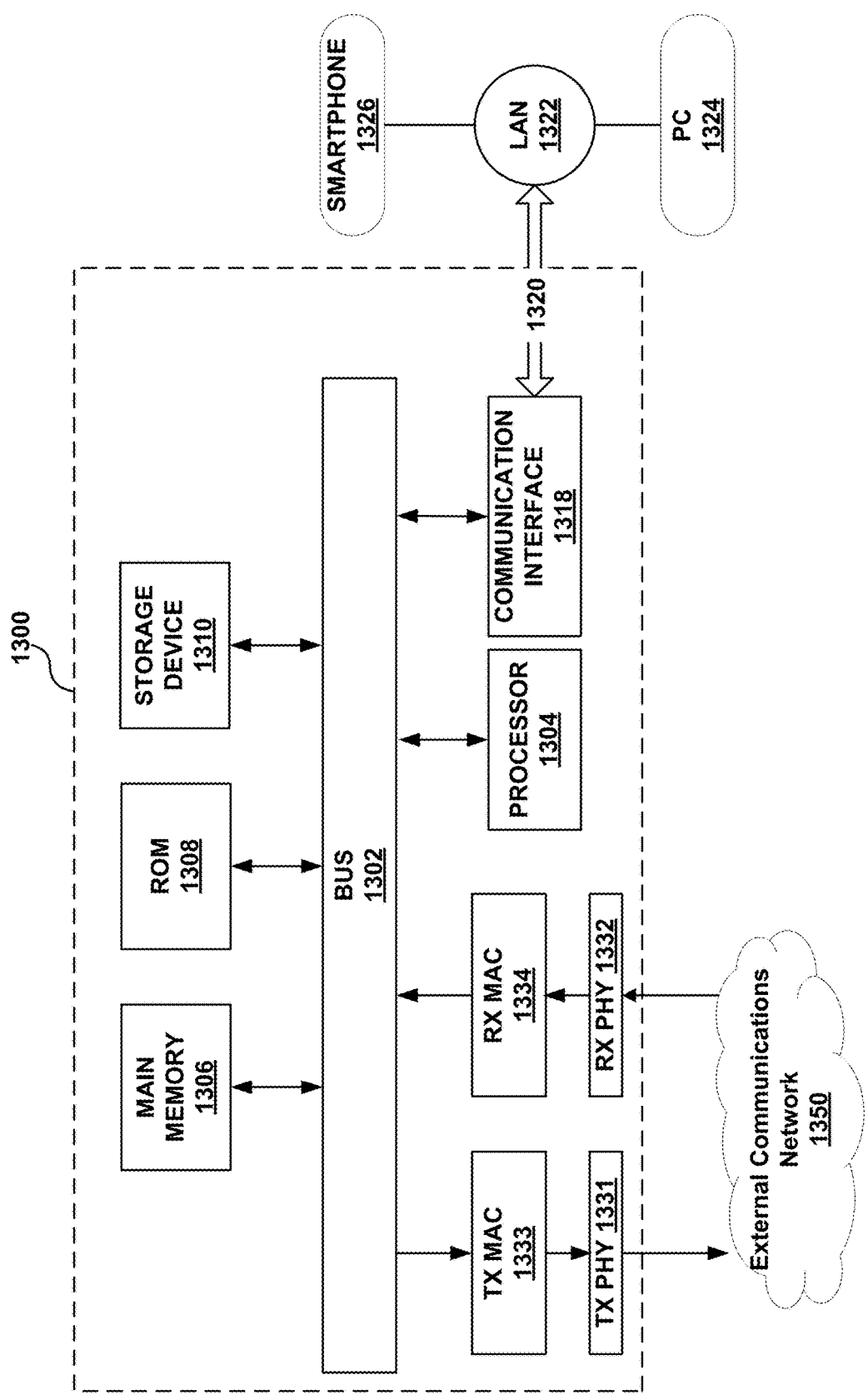
FIG. 12 illustrates a computer system/communication device upon which example embodiments according to the present disclosure can be implemented.

FIG. 12 illustrates a computer system/communication device 1300 upon which example embodiments according to the present disclosure can be implemented. Computer system 1300 can include a bus 1302 or other communication mechanism for communicating information, and a processor 1304 coupled to bus 1302 for processing information. Computer system 1300 may also include main memory 1306, such as a random access memory (RAM) or other dynamic storage device, coupled to bus 1302 for storing information and instructions to be executed by processor 1304. Main memory 1306 can also be used for storing temporary variables or other intermediate information during execution of instructions to be executed by processor 1304. Computer system 1300 may further include a read only memory (ROM) 1308 or other static storage device coupled to bus 1302 for storing static information and instructions for processor 1304. A storage device 1310, such as a magnetic disk or optical disk, may additionally be coupled to bus 1302 for storing information and instructions.

According to one embodiment of the disclosure, dynamic switching between TDM and TDMA inroutes may be provided by computer system 1300 in response to processor 1304 executing an arrangement of instructions contained in main memory 1306. Such instructions can be read into main memory 1306 from another computer-readable medium, such as storage device 1310. Execution of the arrangement of instructions contained in main memory 1306 causes processor 1304 to perform one or more processes described herein. One or more processors in a multi-processing arrangement may also be employed to execute the instructions contained in main memory 1306. In alternative embodiments, hard-wired circuitry is used in place of or in combination with software instructions to implement various embodiments. Thus, embodiments described in the present disclosure are not limited to any specific combination of hardware circuitry and software.

Computer system 1300 may also include a communication interface 1318 coupled to bus 1302. Communication interface 1318 can provide a two-way data communication coupling to a network link 1320 connected to a local network 1322. Wired and/or wireless links may be implemented. In any such implementation, communication interface 1318 sends and receives electrical, electromagnetic, or optical signals that carry digital data streams representing various types of information.

Network link 1320 may provide data communication through one or more networks to other data devices. By way of example, network link 1320 can provide a connection through local area network 1322 to network devices, for example including a host computer (PC) 1324, a smartphone 1326, and the like. Local area network 1322 may both use electrical, electromagnetic, or optical signals to convey information and instructions. The signals through the various networks and the signals on network link 1320 and through communication interface 1318, which communicate digital data with computer system 1300, are example forms of carrier waves bearing the information and instructions.

Computer system 1300 may send messages and receive data, including program code, through the network(s), network link 1320, and communication interface 1318. In the Internet example, a server (not shown) might transmit requested code belonging to an application program for implementing an embodiment of the present disclosure through local network 1322 and communication interface 1318. Processor 1304 executes the transmitted code while being received and/or store the code in storage device 1310, or other non-volatile storage for later execution. In this manner, computer system 1300 obtains application code in the form of a carrier wave.

Computer system 1300 includes equipment for communication with an external communications network. In particular, the computer system 1300 may include a transmit-side physical-layer device (TX PHY) 1331, a receive-side physical-layer device (RX PHY) 1332, a transmit-side media access controller (TX MAC) 1333, and a receive-side media access controller (RX MAC) 1334. Transmit packets may be provided to the TX MAC 1333 and TX PHY 1331, which provide corresponding signals to the external communications network 1350. For example, in a satellite communications network, TX MAC may be a TX satellite link controller (SLC), and TX PHY 1331 may provide corresponding signals to a satellite using a terrestrial antenna/dish. Signals received from an external communications network 1350 may be received via RX PHY 1332 and RX MAC 1334, from which receive packets may be obtained.

Figure 13:
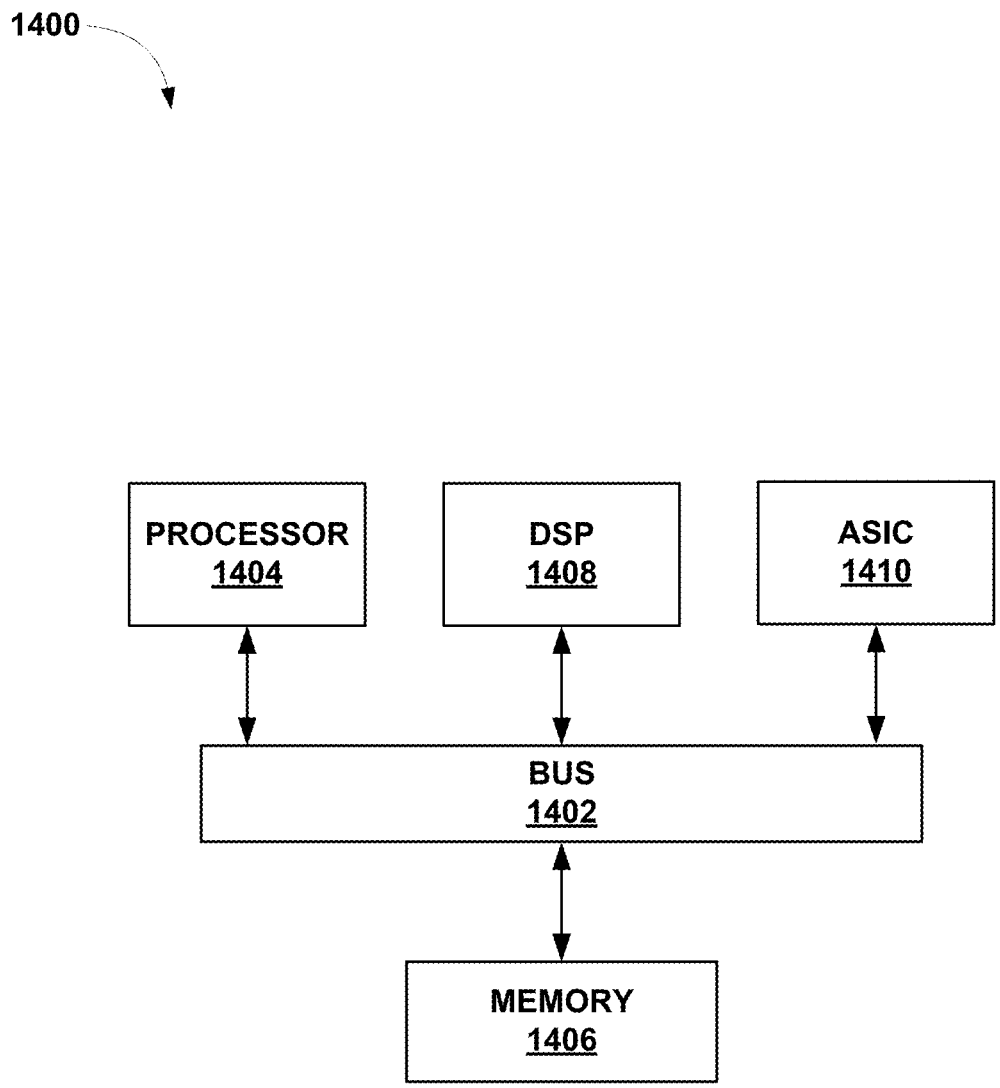
FIG. 13 illustrates a chip set in which embodiments of the disclosure may be implemented.

FIG. 13 illustrates a chip set 1400 in which embodiments of the disclosure may be implemented. Chip set 1400 can include, for instance, processor and memory components described with respect to FIG. 2 or FIG. 12 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 1400 includes a communication mechanism such as a bus 1002 for passing information among the components of the chip set 1400. A processor 1404 has connectivity to bus 1402 to execute instructions and process information stored in a memory 1406. Processor 1404 includes one or more processing cores with each core configured to perform independently. A multi-core processor enables multiprocessing within a single physical package. Examples of a multi-core processor include two, four, eight, or greater numbers of processing cores. Alternatively or in addition, processor 1404 includes one or more microprocessors configured in tandem via bus 1402 to enable independent execution of instructions, pipelining, and multithreading. Processor 1404 may also be accompanied with one or more specialized components to perform certain processing functions and tasks such as one or more digital signal processors (DSP) 1408, and/or one or more application-specific integrated circuits (ASIC) 1410. DSP 1408 can typically be configured to process real-world signals (e.g., sound) in real time independently of processor 1404. Similarly, ASIC 1410 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 1404 and accompanying components have connectivity to the memory 1406 via bus 1402. Memory 1406 includes both dynamic memory (e.g., RAM) and static memory (e.g., ROM) for storing executable instructions that, when executed by processor 1404, DSP 1408, and/or ASIC 1410, perform the process of example embodiments as described herein. Memory 1406 also stores the data associated with or generated by the execution of the process.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another, or may be combined in various ways. Different combinations and subcombinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
   communicating, using a satellite terminal, over an inroute Time Division Multiple Access (TDMA) channel;
   determining, at the satellite terminal, based at least on an aggregate ingress traffic rate to the satellite terminal, to switch communications from the inroute TDMA channel to an inroute Time Division Multiplexing (TDM) channel; and
   after determining to switch communications, sending, from the satellite terminal to a Gateway Earth Station (GW), a request to be allocated an inroute TDM channel.

2. The method of claim 1, wherein the aggregate ingress traffic rate is an aggregate ingress traffic rate of one or more traffic flows received by the satellite terminal on a local area network (LAN) of the satellite terminal.

3. The method of claim 2, wherein determining to switch communications, comprises: determining that the aggregate ingress traffic rate exceeds or equals a threshold for a time period.

4. The method of claim 2, wherein determining to switch communications, comprises:
   determining that at least one of the traffic flows matches a TDMA to TDM switching rule; and
   determining that the aggregate ingress traffic rate exceeds or equals a threshold.

5. The method of claim 4, wherein the aggregate ingress traffic rate is determined at the satellite terminal in response to determining that that at least one of the traffic flows matches a TDMA to TDM switching rule.

6. The method of claim 4, wherein determining that at least one of the traffic flows matches the TDMA to TDM switching rule, comprises:
   classifying each of the one or more traffic flows; and
   and determining, based on a classification table, that one of the classified traffic flows matches the TDMA to TDM switching rule.

7. The method of claim 1, further comprising: after sending the request:
   receiving, at the satellite terminal from the GW, a response message indicating that an inroute TDM channel was successfully allocated, the response message including information identifying the allocated inroute TDM channel; and
   after receiving the response message, switching at the satellite terminal from communicating over the inroute TDMA channel to communicating over the allocated inroute TDM channel.

8. The method of claim 7 wherein sending the request, comprises: sending the request to the GW over the inroute TDMA channel, wherein the response message is received by the satellite terminal over the inroute TDMA channel.

9. The method of claim 7 wherein the request comprises an identification of a TDM inroute group managed at the GW, wherein the TDM inroute group comprises a plurality TDM channels, and wherein the allocated inroute TDM channel is one of the plurality of TDM channels.

10. The method of claim 7 further comprising: after switching at the satellite terminal from communicating over the inroute TDMA channel to communicating over the allocated inroute TDM channel: transmitting, from the satellite terminal to the GW, a periodic keep alive message to remain on the allocated inroute TDM channel.

11. The method of claim 7, further comprising: after switching at the satellite terminal from communicating over the inroute TDMA channel to communicating over the allocated inroute TDM channel:
determining, at the satellite terminal, to switch back to communicating over an inroute TDMA channel; and
after determining to switch back, sending, from the satellite terminal to the GW, a channel release request to release the allocated inroute TDM channel.

12. The method of claim 11, wherein determining, at the satellite terminal, to switch back to communicating over an inroute TDMA channel, comprises: determining at least one of the following conditions:
the aggregate ingress traffic rate to the satellite terminal dropped to below a threshold or equal to the threshold for a period of time; and
determining that no traffic flow received at the satellite terminal matches a TDMA to TDM switching rule.

13. The method of claim 1, further comprising: after sending the request:
receiving, at the satellite terminal from the GW, a response message indicating a failure to allocate an inroute TDM channel; and
after receiving the response message: resending, after a predetermined time period, the request to be allocated an inroute TDM channel.

14. A satellite terminal, comprising:
one or more processors; and
one or more non-transitory computer-readable storage medium storing instructions that, when executed by the one or more processors, cause the satellite terminal to perform a method, comprising:
communicating, using a satellite terminal, over an inroute Time Division Multiple Access (TDMA) channel;
determining, at the satellite terminal, based at least on an aggregate ingress traffic rate to the satellite terminal, to switch communications from the inroute TDMA channel to an inroute Time Division Multiplexing (TDM) channel; and
after determining to switch communications, sending, from the satellite terminal to a Gateway Earth Station (GW), a request to be allocated an inroute TDM channel.

15. The satellite terminal of claim 14, wherein the aggregate ingress traffic rate is an aggregate ingress traffic rate of one or more traffic flows received by the satellite terminal on a local area network (LAN) of the satellite terminal.

16. The satellite terminal of claim 15, wherein determining to switch communications, comprises:
determining that at least one of the traffic flows matches a TDMA to TDM switching rule; and
determining that the aggregate ingress traffic rate exceeds or equals a threshold.

17. A method, comprising:
receiving, at a Gateway Earth Station (GW), a request from a satellite terminal to be allocated a Time Division Multiplexing (TDM) channel for inroute communications;
in response to receiving the request, determining at the GW, that the satellite terminal is eligible to be assigned an inroute TDM channel from a TDM inroute group;
assigning the inroute TDM channel to the satellite terminal; and
transmitting a message to the terminal identifying the assigned inroute TDM channel.

18. The method of claim 17, wherein the request comprises an identifier of the TDM inroute group, wherein determining that the satellite terminal is eligible to be assigned the inroute TDM channel from the TDM inroute group, comprises:
identifying, using the identifier in the request, the TDM inroute group; and
determining that the inroute TDM channel is available for assignment from the TDM inroute group.

19. The method of claim 18, wherein determining that the inroute TDM channel is available for assignment from the TDM inroute group, comprises: determining the inroute TDM channel is not currently assigned to another satellite terminal.

20. The method of claim 18, wherein the satellite terminal is a first satellite terminal,
wherein determining that the inroute TDM channel is available for assignment from the TDM inroute group, comprises: determining that a priority of the first satellite terminal is higher than a priority of a second satellite terminal currently assigned the inroute TDM channel; and
assigning the inroute TDM channel, comprises: reassigning the inroute TDM channel from the second satellite terminal to the first satellite terminal.

* * * * *